US012782843B2

(12) United States Patent
Murakami

(10) Patent No.: US 12,782,843 B2
(45) Date of Patent: Nov. 3, 2026

(54) IMAGE FORMING APPARATUS

(71) Applicant: Masatoshi Murakami, Kanagawa (JP)

(72) Inventor: Masatoshi Murakami, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 19/241,433

(22) Filed: Jun. 18, 2025

(65) Prior Publication Data

US 2025/0390035 A1 Dec. 25, 2025

(30) Foreign Application Priority Data

Jun. 24, 2024 (JP) ................................ 2024-101392

(51) Int. Cl.
*G03G 15/04* (2006.01)
*G03G 15/00* (2006.01)
*G03G 15/043* (2006.01)

(52) U.S. Cl.
CPC ..... *G03G 15/043* (2013.01); *G03G 15/04036* (2013.01); *G03G 15/5041* (2013.01)

(58) Field of Classification Search
None
See application file for complete search history.

(56) References Cited

U.S. PATENT DOCUMENTS

2008/0124114 A1* 5/2008 Yamagata .......... G03G 15/0131 399/74
2010/0080577 A1* 4/2010 Murayama ......... G03G 15/0194 399/32
2014/0009555 A1* 1/2014 Itami .................... G02B 26/123 347/261
2014/0152754 A1 6/2014 Murakami et al.
2015/0346626 A1 12/2015 Kohri et al.
2016/0370728 A1 12/2016 Yamaguchi et al.
2019/0039385 A1* 2/2019 Nakano .................. G03G 21/00
2024/0201613 A1 6/2024 Murakami
(Continued)

FOREIGN PATENT DOCUMENTS

JP 2001-296489 A 10/2001
JP 2002-303807 A 10/2002
(Continued)

*Primary Examiner* — Sevan A Aydin
(74) *Attorney, Agent, or Firm* — XSENSUS LLP

(57) ABSTRACT

An image forming apparatus includes a photoconductor; a light-emitting element; a deflector to deflect a beam emitted by the light-emitting element to scan the photoconductor with the beam; a photodetector element to detect the beam with multiple sensitivities to determine a write start timing at which the light-emitting element start emitting the beam; and circuitry. The circuitry switches to any one of the multiple sensitivities of the photodetector element; controls the light-emitting element to set a light intensity of the beam; switches the multiple sensitivities according to the light intensity; uses characteristic value information of a relationship between the light intensity and an amount of change in the write start timing to correct a shift in the write start timing; calculates the amount of change while switching to each of the multiple sensitivities; and updates a characteristic value in the characteristic value information based on the amount of change.

20 Claims, 22 Drawing Sheets

(56) References Cited

U.S. PATENT DOCUMENTS

| | | | | |
|---|---|---|---|---|
| 2025/0264824 | A1* | 8/2025 | Murakami ......... | G03G 15/0415 |
| 2025/0370373 | A1* | 12/2025 | Murakami ......... | G03G 15/0435 |
| 2026/0064033 | A1* | 3/2026 | Kimura .............. | G03G 15/0435 |

FOREIGN PATENT DOCUMENTS

| | | | |
|---|---|---|---|
| JP | 2003-121770 | A | 4/2003 |
| JP | 2021-186974 | A | 12/2021 |
| JP | 2024-088440 | A | 7/2024 |

* cited by examiner

FIG. 14A

| LIGHT INTENSITY OF LASER BEAM | LASER DIODE 21a | LASER DIODE 21b |
|---|---|---|
| 1.0 mW | 0 ns | 0 ns |
| 1.1 mW | 3.157 ns | −2.526 ns |
| 1.2 mW | 6.030 ns | −4.824 ns |
| 1.3 mW | 8.640 ns | −6.912 ns |
| ... | ... | ... |
| 7.2 mW | 37.066 ns | −29.653 ns |

FIG. 14B

| LIGHT INTENSITY RATIO OF LASER BEAM | LASER DIODE 21a | LASER DIODE 21b |
|---|---|---|
| −75% | 0 ns | 0 ns |
| −72.5% | 3.157 ns | −2.526 ns |
| −70% | 6.030 ns | −4.824 ns |
| −67.5% | 8.640 ns | −6.912 ns |
| ... | ... | ... |
| +80% | 37.066 ns | −29.653 ns |

FIG. 15

| LIGHT INTENSITY OF LASER BEAM | LASER DIODE 21a | LASER DIODE 21b |
|---|---|---|
| 1.0 mW | 0 ns | 0 ns |
| 1.1 mW | 3.157 ns | −2.526 ns |
| ... | ... | ... |
| 3.8 mW | 31.680 ns | −25.344 ns |
| 3.9 mW | 31.975 ns | −25.580 ns |
| 4.0 mW | 32.262 ns | −25.810 ns |
| 4.1 mW | 32.542 ns | −26.033 ns |
| 4.2 mW | 32.842 ns | −26.273 ns |
| ... | ... | ... |
| 7.1 mW | 36.941 ns | −29.553 ns |
| 7.2 mW | 37.066 ns | −29.653 ns |

AMOUNT OF CHANGE IN WRITE START TIMING WITH LIGHT INTENSITY OF LASER BEAM USED DURING PRINT OPERATION

AMOUNT OF CHANGE IN WRITE START TIMING WITH LIGHT INTENSITY OF LASER BEAM USED DURING EXECUTION OF COLOR MATCHING

FIG. 17

| GAIN SWITCHING SIGNAL | | GAIN RESISTANCE VALUE | REFERENCE | RESISTANCE RATIO | USE TIMING | NOTE |
|---|---|---|---|---|---|---|
| SIG1 | SIG2 | | | | | |
| OFF | OFF | 3.00 kΩ | | 1.299 | CHARACTERISTIC VALUE UPDATING PROCESS | BASED ON MAXIMUM LIGHT INTENSITY OF LASER BEAM |
| ON | OFF | 2.31 kΩ | ✓ | 1.000 | PRINT OPERATION/ CHARACTERISTIC VALUE UPDATING PROCESS | |
| OFF | ON | 1.89 kΩ | | 0.818 | CHARACTERISTIC VALUE UPDATING PROCESS | |
| ON | ON | 1.59 kΩ | | 0.688 | PRINT OPERATION/ CHARACTERISTIC VALUE UPDATING PROCESS | BASED ON MINIMUM LIGHT INTENSITY OF LASER BEAM |

FIG. 18

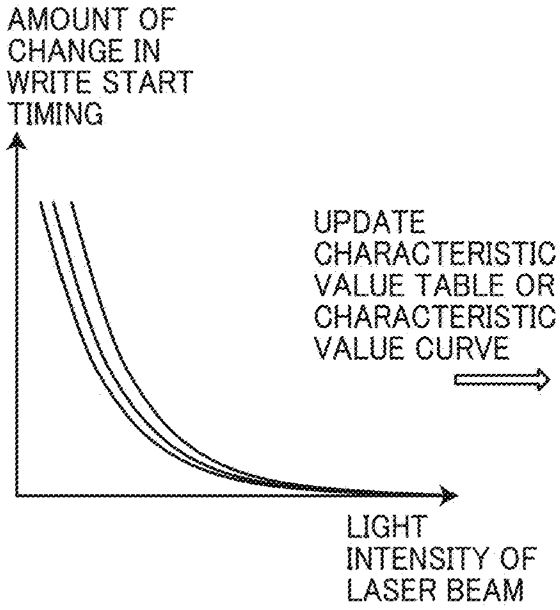

UPDATE CHARACTERISTIC VALUE TABLE OR CHARACTERISTIC VALUE CURVE ⇒

CHARACTERISTIC VALUE TABLE

| LIGHT INTENSITY OF LASER BEAM | LASER DIODE 21a | LASER DIODE 21b |
|---|---|---|
| 1.0 mW | 0 ns | 0 ns |
| 1.1 mW | 3.157 ns | −2.526 ns |
| ... | ... | ... |
| 3.8 mW | 31.680 ns | −25.344 ns |
| 3.9 mW | 31.975 ns | −25.580 ns |
| 4.0 mW | 32.262 ns | −25.810 ns |
| 4.1 mW | 32.542 ns | −26.033 ns |
| 4.2 mW | 32.842 ns | −26.273 ns |
| ... | ... | ... |
| 7.1 mW | 36.941 ns | −29.553 ns |
| 7.2 mW | 37.066 ns | −29.653 ns |

AMOUNT OF CHANGE STORED IN ASSOCIATION WITH EACH LIGHT INTENSITY IN CASE OF CHARACTERISTIC VALUE TABLE

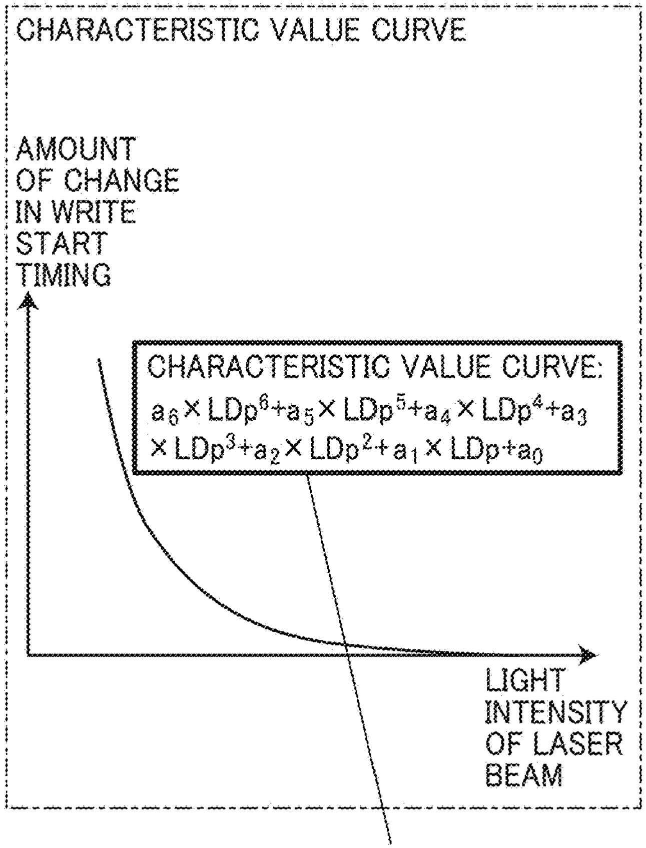

COEFFICIENT OF EACH TERM IN POLYNOMIAL IN CASE OF CHARACTERISTIC VALUE CURVE

| LIGHT INTENSITY OF LASER BEAM | LASER DIODE 21a | LASER DIODE 21b |
|---|---|---|
| 1.0 mW | 0 ns | 0 ns |
| 1.1 mW | 3.157 ns | −2.526 ns |
| ... | ... | ... |
| 3.8 mW | 31.680 ns | −25.344 ns |
| 3.9 mW | 31.975 ns | −25.580 ns |
| 4.0 mW | 32.262 ns | −25.810 ns |
| 4.1 mW | 32.542 ns | −26.033 ns |
| 4.2 mW | 32.842 ns | −26.273 ns |
| ... | ... | ... |
| 7.1 mW | 36.941 ns | −29.553 ns |
| 7.2 mW | 37.066 ns | −29.653 ns |

IMAGE FORMING APPARATUS

CROSS-REFERENCE TO RELATED APPLICATION

This patent application is based on and claims priority pursuant to 35 U.S.C. § 119(a) to Japanese Patent Application No. 2024-101392, filed on Jun. 24, 2024, in the Japan Patent Office, the entire disclosure of which is hereby incorporated by reference herein.

BACKGROUND

Technical Field

The present disclosure relates to an image forming apparatus.

Related Art

Electrophotographic image forming apparatuses use a laser diode to expose a photoconductor to light. In such image forming apparatuses, a laser beam output from the laser diode is reflected by a rotating polygon mirror.

SUMMARY

The present disclosure described herein provides an image forming apparatus including a photoconductor; a light-emitting element to emit a beam; a deflector to deflect the beam emitted by the light-emitting element to scan the photoconductor with the beam to form a latent image on the photoconductor; a photodetector element to detect the beam with multiple sensitivities to determine a write start timing at which the light-emitting element start emitting the beam; and circuitry. The circuitry switches to any one of the multiple sensitivities of the photodetector element; controls the light-emitting element to set a light intensity of the beam; switches the multiple sensitivities according to the light intensity; uses characteristic value information of a relationship between the light intensity and an amount of change in the write start timing to correct a shift in the write start timing; calculates the amount of change while switching to each of the multiple sensitivities; and updates a characteristic value in the characteristic value information based on the amount of change.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 10A-1, 10A-2, and 10B are diagrams for describing a shift of a write start timing when a gain is switched in the image forming apparatus according to the embodiment;

FIGS. 12A, 12B-1, and 12B-2 are diagrams for describing gain switching in the synchronization detection board of the image forming apparatus according to the embodiment to prevent erroneous detection of stray light;

FIGS. 13A, 13B-1, and 13B-2 are diagrams for describing gain switching in the synchronization detection board of the image forming apparatus according to the embodiment to prevent missed detection;

FIGS. 14A and 14B are diagrams illustrating an example of a characteristic value table;

FIG. 15 is a diagram for describing an example of a usage method of the characteristic value table;

FIG. 17 is a diagram for describing how a resistance for determining a gain resistance value of the photosensor is determined;

FIG. 18 is a diagram for describing an overview of an operation of a characteristic value updating process of the image forming apparatus according to the embodiment;

Figure 1:
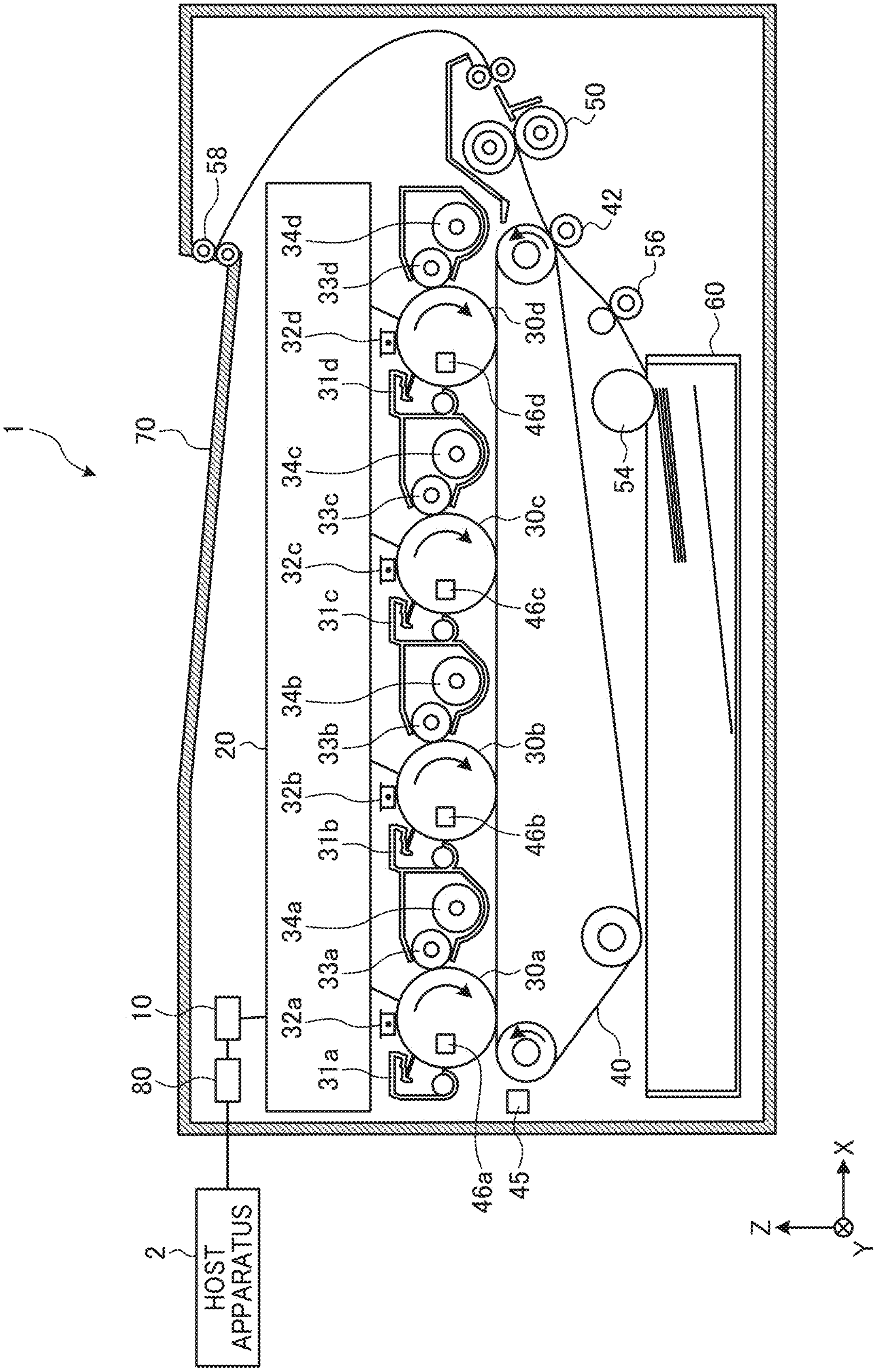
FIG. 1 is a diagram illustrating an example of a configuration of an image forming apparatus according to an embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

In a typical image forming apparatuses, a laser beam output from the laser diode is reflected by a rotating polygon mirror. When one face of the polygon mirror is irradiated with the laser beam from end to end, the laser beam is deflected in accordance with the angle of the polygon mirror to scan the photoconductor for one line. During this time, the laser diode is switched on and off in accordance with input image data, so that an electrostatic latent image for one line is formed on the photoconductor. The image forming apparatuses iterate a line scan while rotating the photoconductor to successfully form an electrostatic latent image of a desired image. In this case, when iterating the line scan, the image forming apparatuses desirably make the write start timing for starting formation of the image constant. To determine the write start timing, the image forming apparatuses have a configuration including a photosensor to detect a position to be scanned with the laser beam. The photosensor is provided at a position where the laser beam passes immediately before scanning the photoconductor. The image forming apparatuses determine the write start timing of image data in accordance with an output signal of the photosensor. The photosensor includes a photodiode, and uses a gain to detect a slight change in current. Based on the change in current, the photosensor determines whether input of the laser beam is present. The light intensity of the laser beam is changed depending on conditions. Examples of the conditions include a change in resolution of an output image, a change in productivity (linear velocity), and a change in temperature environment. Accordingly, along with the change in light intensity of the laser beam from the laser diode, the light intensity of the laser beam input to the photosensor also changes. The change in light intensity of the laser beam changes the magnitude of the current flowing through the photosensor. Consequently, a detection waveform changes. The change in the detection waveform of the photosensor shifts the write start timing of the image data. This causes a positional misalignment in a scanning direction (main-scanning direction). This positional misalignment causes a color change and a color shift, and degrades image quality particularly in the case of color image forming apparatuses.

The shift of the write start timing also occurs when the gain of the photosensor is switched. As described above, the light intensity of the laser beam is changed depending on the conditions. Within the range of this change, the light intensity of the laser beam entering the photosensor also changes. In this case, the gain is desirably set so that a laser beam of any light intensity is detectable. However, when the range of the light intensity change is wide, setting a single gain is not enough for covering the range. Setting an excessively small gain may cause missed detection of the laser beam. Conversely, setting an excessively large gain may cause erroneous detection because stray light or flare light enters the photosensor. To avoid such abnormal actions, the gain is switched to a large gain when the light intensity of the laser beam is small, and to a small gain when the light intensity of the laser beam is large. Such gain switching enables stable detection of the laser beam. However, gain switching greatly changes the waveform of the detection signal of the photosensor. This shifts the write start timing of the image data, and consequently causes a positional misalignment in the scanning direction (main-scanning direction).

A first technique of the related art for coping with such a shift of the write start timing is as follows. For example, a gain variable circuit has a first gain usable in a first light intensity range and a second gain usable in a second light intensity range that includes a lower light intensity range than the first light intensity range. The gain of the gain variable circuit is switched to the first gain or the second gain to output a signal before a target time after light is incident onto a photodetector.

A second technique of the related art is as follows. A correction amount of a write start timing of image data is calculated based on two measurement results of an interval between synchronization detection signals at a constant gain and an interval between synchronization detection signals when the gain is switched midway during line scans.

A third technique of the related art is as follows. A correction value (second control value) for a shift of a write start timing that changes in accordance with a light intensity setting value of a light beam is added to a registration correction value (first control value). A gain is switched to correct the shift. The detailed method of calculating the second control value is also provided.

However, the first technique fails to suppress image quality degradation because the write start timing shifts in response to gain switching. The second technique uses a function of measuring an interval between the synchronization detection signals in line scans, and thus uses a logic circuit for measurement. This makes the implementation complicated, and a significant increase in cost is inevitable. The third technique determines the correction value in advance. However, the correction value changes due to an influence of variations in characteristics of the components of an optical writing device. Thus, the third technique fails to apply an optimum correction value suitable for each image forming apparatus.

According to the present disclosure, the shift of the write start timing that occurs in response to gain switching can be appropriately corrected, the shift can be corrected by the correction value corresponding to the image forming apparatus, and the cost can be reduced.

An image forming apparatus according to an embodiment of the present disclosure will be described in detail below with reference to the drawings. The present disclosure, however, is not limited to the following embodiment, and components of the following embodiment include components that may be easily conceived by those skilled in the art, components being substantially the same, and components being within equivalent ranges. Furthermore, various omissions, substitutions, changes, and combinations of the components can be made without departing from the gist of the following embodiment.

Configuration of Image Forming Apparatus

Figure 2:
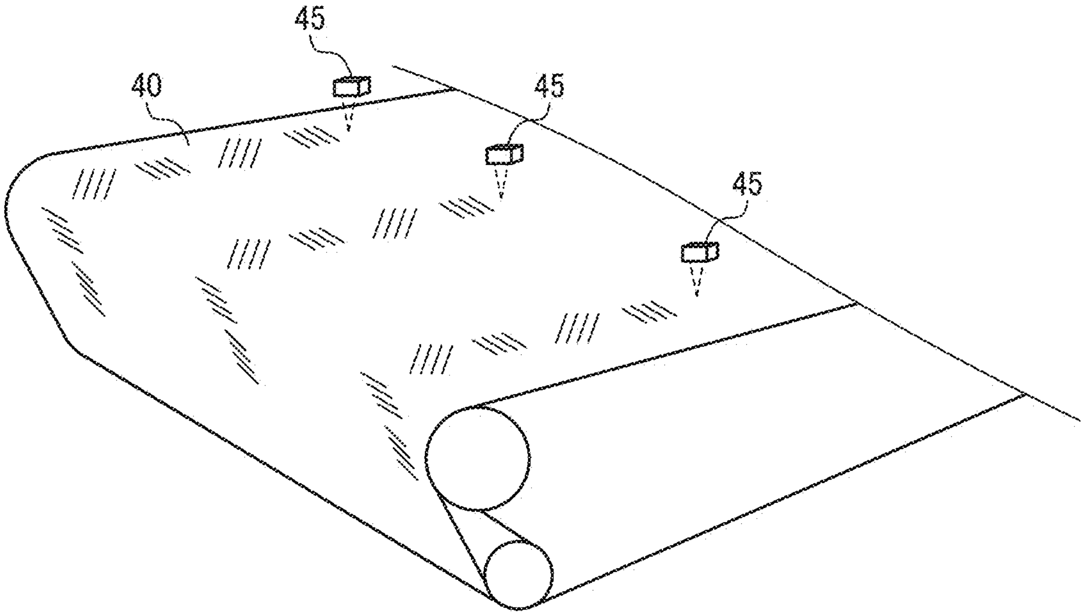
FIG. 2 is a diagram for describing an example of an operation performed by the image forming apparatus according to the embodiment to form a color matching pattern and correct a color shift.
Figure 3:
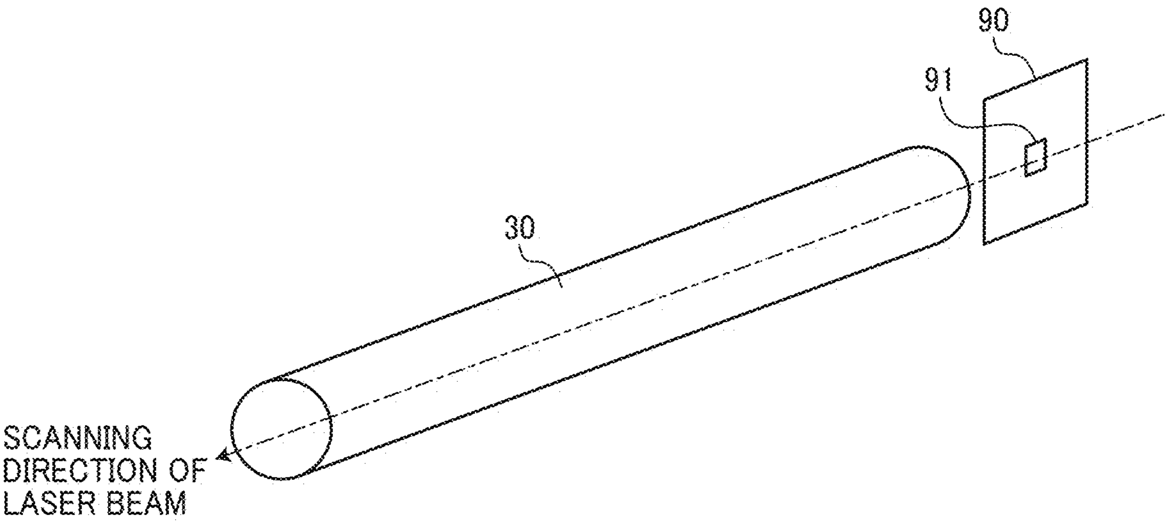
FIG. 3 is a diagram for describing an example of a laser beam scanning operation in the image forming apparatus according to the embodiment.
Figure 4:
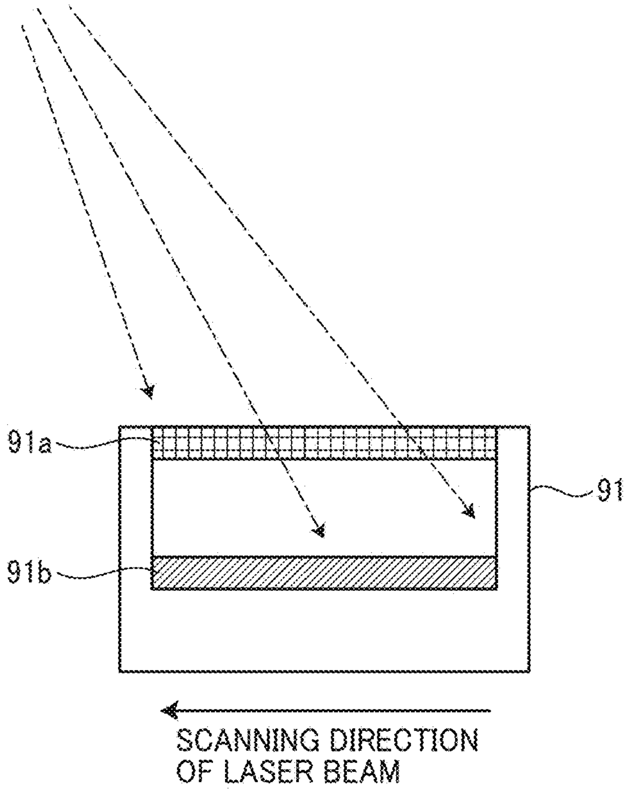
FIG. 4 is a diagram for describing how a laser beam is incident on a photosensor of the image forming apparatus according to the embodiment.
Figure 5A:
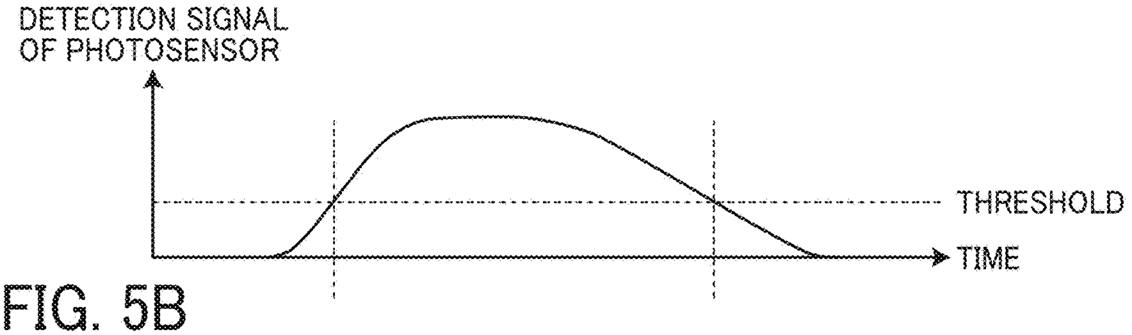
FIGS. 5A and 5B are diagrams each for describing an example of a detection signal and an output signal of the photosensor of the image forming apparatus according to the embodiment.
Figure 5B:
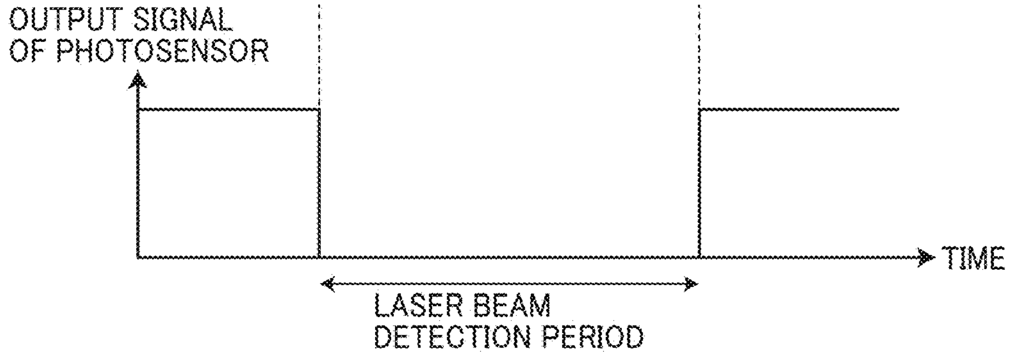

FIG. 1 is a diagram illustrating an example of a configuration of the image forming apparatus according to the embodiment. FIG. 2 is a diagram for describing an example of an operation performed by the image forming apparatus according to the embodiment to form a color matching pattern and correct a color shift. FIG. 3 is a diagram for describing an example of a laser beam scanning operation in the image forming apparatus according to the embodiment. FIG. 4 is a diagram for describing how a laser beam is incident on a photosensor of the image forming apparatus according to the embodiment. FIGS. 5A and 5B are diagrams, each for describing an example of a detection signal and an output signal of the photosensor of the image forming apparatus according to the embodiment. The configuration of an image forming apparatus 1 according to the present embodiment will be described with reference to FIGS. 1 to 5.

The image forming apparatus 1 illustrated in FIG. 1 transfers toner onto a recording sheet to create a printed material. For example, the image forming apparatus 1 is a tandem-system apparatus for superimposing four colors (cyan, magenta, yellow, and black) together to form a full-color image.

As illustrated in FIG. 1, the image forming apparatus 1 includes a control device 10 (controller), an optical writing device 20, four photoconductor drums 30*a*, 30*b*, 30*c*, and 30*d*, four cleaning units 31*a*, 31*b*, 31*c*, and 31*d*, four charging devices 32*a*, 32*b*, 32*c*, and 32*d*, four developing rollers 33*a*, 33*b*, 33*c*, and 33*d*, and four toner cartridges 34*a*, 34*b*, 34*c*, and 34*d*. As illustrated in FIG. 1, the image forming apparatus 1 further includes a transfer belt 40, a transfer roller 42, a density detector 45 (detector), four home position sensors 46*a*, 46*b*, 46*c*, and 46*d*, a fixing roller 50, a sheet feeding roller 54, a registration roller pair 56, a sheet ejection roller 58, a sheet feeding tray 60, a sheet ejection tray 70, and a communication control device 80.

The photoconductor drum 30*a*, the cleaning unit 31*a*, the charging device 32*a*, the developing roller 33*a*, and the toner cartridge 34*a* are used as a set. These components constitute an image forming station (also referred to as a "K station") that forms a black (K) image.

The photoconductor drum 30*b*, the cleaning unit 31*b*, the charging device 32*b*, the developing roller 33*b*, and the toner cartridge 34*b* are used as a set. These components constitute an image forming station (also referred to as a "C station") that forms a cyan (C) image.

The photoconductor drum 30*c*, the cleaning unit 31*c*, the charging device 32*c*, the developing roller 33*c*, and the toner cartridge 34*c* are used as a set. These components constitute an image forming station (also referred to as an "M station") that forms a magenta (M) image.

The photoconductor drum 30*d*, the cleaning unit 31*d*, the charging device 32*d*, the developing roller 33*d*, and the toner cartridge 34*d* are used as a set. These components constitute an image forming station (also referred to as a "Y station") that forms a yellow (Y) image.

The photoconductor drums 30*a*, 30*b*, 30*c*, and 30*d* may be simply referred to as "photoconductor drum(s) 30" (photoconductor(s)) to indicate any one of the photoconductor drums 30*a*, 30*b*, 30*c*, and 30*d* or collectively indicate the photoconductor drums 30*a*, 30*b*, 30*c*, and 30*d*. The cleaning units 31*a*, 31*b*, 31*c*, and 31*d* may be simply referred to as "cleaning unit(s) 31" to indicate any one of the cleaning units 31*a*, 31*b*, 31*c*, and 31*d* or collectively indicate the cleaning units 31*a*, 31*b*, 31*c*, and 31*d*. The charging devices 32*a*, 32*b*, 32*c*, and 32*d* may be simply referred to as "charging device(s) 32" to indicate any one of the charging devices 32*a*, 32*b*, 32*c*, and 32*d* or collectively indicate the charging devices 32*a*, 32*b*, 32*c*, and 32*d*.

The developing rollers 33*a*, 33*b*, 33*c*, and 33*d* may be simply referred to as "developing roller(s) 33" to indicate any one of the developing rollers 33*a*, 33*b*, 33*c*, and 33*d* or collectively indicate the developing rollers 33*a*, 33*b*, 33*c*, and 33*d*. The toner cartridges 34*a*, 34*b*, 34*c*, and 34*d* may be simply referred to as "toner cartridge(s) 34" to indicate any one of the toner cartridges 34*a*, 34*b*, 34*c*, and 34*d* or collectively indicate the toner cartridges 34*a*, 34*b*, 34*c*, and 34*d*. The home position sensors 46*a*, 46*b*, 46*c*, and 46*d* may be simply referred to as "home position sensor(s) 46" to indicate any one of the home position sensors 46*a*, 46*b*, 46*c*, and 46*d* or collectively indicate the home position sensors 46*a*, 46*b*, 46*c*, and 46*d*.

The control device 10 centrally controls each of the devices included in the image forming apparatus 1. The control device 10 includes a central processing unit (CPU), a read-only memory (ROM), a random access memory (RAM), and an analog-to-digital (AD) conversion circuit, for example. The ROM stores a program written in code to be executed by the CPU and various kinds of data used during execution of the program. The RAM is a work memory. The AD conversion circuit converts analog data into digital data. The control device 10 controls each of the devices in response to a request from a host apparatus 2, and sends image data received from the host apparatus 2 to the optical writing device 20. The host apparatus 2 is an information processing apparatus, such as a personal computer (PC) or a workstation, that transmits a print job to the control device 10 via the communication control device 80. The print job includes image data to be printed. Details of the configuration and operation of the control device 10 will be described later with reference to FIG. 11.

The optical writing device 20 is an optical device that irradiates the surface of the corresponding charged photoconductor drum 30 (photoconductor) with a laser beam modulated for the corresponding color, based on the image data (cyan image data, magenta image data, yellow image data, or black image data). Consequently, the charge is lost in an area irradiated with the beam on the surface of each photoconductor drum 30, and an electrostatic latent image corresponding to the image data is formed on the surface of each photoconductor drum 30. The electrostatic latent image formed on the surface of each photoconductor drum 30 moves toward the corresponding developing roller 33 as the photoconductor drum 30 rotates. Details of the configuration of the optical writing device 20 will be described later in FIGS. 6 and 7.

The photoconductor drum 30 is an example of a latent image bearer, and is a drum-shaped member having a photoconductive layer on the surface thereof. That is, the surface of the photoconductor drum 30 serves as a surface to be scanned. For example, the photoconductor drums 30*a*, 30*b*, 30*c*, and 30*d* are arranged next to each other with rotation axes thereof in parallel to each other, and rotate in the same direction (e.g., a direction indicated by arrows in FIG. 1).

Herein, the description will be given on assumption that in the XYZ three-dimensional orthogonal coordinate system, a direction parallel to a center axis of each photoconductor drum 30 is a Y-axis direction and a direction in which the photoconductor drums 30 are arranged is an X-axis direction.

The cleaning unit 31 removes toner remaining (residual toner) on the surface of the corresponding photoconductor drum 30. The surface of the photoconductor drum 30 from which the residual toner is removed returns to a position facing the corresponding charging device 32 again.

The charging device 32 uniformly charges the surface of the corresponding photoconductor drum 30.

The toner from the corresponding toner cartridge 34 is thinly and evenly applied onto the surface of the developing roller 33 as the developing roller 33 rotates. When the toner on the surface of the developing roller 33 comes into contact with the surface of the corresponding photoconductor drum 30, the toner attaches to the area of the photoconductor drum 30 irradiated with the beam. That is, the developing roller 33 attaches the toner to the electrostatic latent image formed on the surface of the corresponding photoconductor drum 30 to visualize the latent image and thus forms a toner image.

The toner cartridge 34*a* supplies black toner to the developing roller 33*a*. The toner cartridge 34*b* supplies cyan toner to the developing roller 33*b*. The toner cartridge 34*c* supplies magenta toner to the developing roller 33*c*. The toner cartridge 34*d* supplies yellow toner to the developing roller 33*d*.

The transfer belt 40 is stretched around a belt rotating mechanism to rotate in a certain direction. An outer surface of the transfer belt 40 is in contact with the surface of each of the photoconductor drums 30 at a position opposite the optical writing device 20. The toner images on the respective photoconductor drums 30 are sequentially transferred to be superimposed in multiple layers, so that a color toner image is transferred. The outer surface of the transfer belt 40 is also in contact with the transfer roller 42.

The transfer roller 42 is in contact with the outer surface of the transfer belt 40 with a recording sheet therebetween, and transfers the color toner image formed on the transfer belt 40 onto the recording sheet.

The density detector 45 is a sensor (TM sensor) that is arranged on −X side with respect to the transfer belt 40 (at a position downstream the four photoconductor drums 30) and detects a toner density of the color toner image on the transfer belt 40. For example, as illustrated in FIG. 2, multiple density detectors 45 are arranged in a direction (main-scanning direction) orthogonal to the moving direction of the transfer belt 40. When executing a color matching operation, the image forming apparatus 1 forms a color matching pattern. The color matching pattern passes through the detection positions of the respective density detectors 45, so that the density detectors 45 each detect the density. The image forming apparatus 1 uses the detection results obtained by the respective density detectors 45 to calculate correction values for correcting a misregistration and magnification deviation between the colors. The correction value for the write start timing is one of these correction values.

The home position sensor 46 detects a home position (original position) of the rotation of the corresponding photoconductor drum 30.

The fixing roller 50 applies heat and pressure to the recording sheet to fix the toner on the recording sheet. The recording sheet with the toner fixed is conveyed to the sheet ejection tray 70 via the sheet ejection roller 58. The recording sheets are sequentially stacked on the sheet ejection tray 70.

The sheet feeding roller 54 is a member that is arranged near the sheet feeding tray 60, and feeds recording sheets from the sheet feeding tray 60 one by one and conveys the recording sheets to the registration roller pair 56.

The registration roller pair 56 sends the recording sheet toward a gap between the transfer belt 40 and the transfer roller 42 at a predetermined timing. Thus, the color toner image on the transfer belt 40 is transferred to the recording sheet. The recording sheet on which the color toner image is transferred is sent to the fixing roller 50.

The sheet ejection roller 58 ejects the recording sheet on which the color toner image has been transferred and that has been sent from the fixing roller 50, to the sheet ejection tray 70.

The sheet feeding tray 60 stores recording sheets. The sheet ejection tray 70 is a tray onto which the recording sheets each having the transferred color toner image and ejected by the sheet ejection roller 58 are stacked.

The communication control device 80 controls bidirectional communication with the host apparatus 2 (e.g., a computer) via a network. The communication control device 80 implements communication confirming to, for example, the Transmission Control Protocol/Internet Protocol (TCP/IP) standard or the Universal Serial Bus (USB) standard.

As illustrated in FIG. 3, the image forming apparatus 1 includes a synchronization detection board 90, which is equipped with a photosensor 91 (photodetector element) that detects a laser beam scanned onto each photoconductor drum 30 from the optical writing device 20. That is, the image forming apparatus 1 includes the synchronization detection board 90 for each photoconductor drum 30. To simplify the description, FIG. 3 illustrates the synchronization detection board 90 arranged on the extension of the axis of the photoconductor drum 30. The actual arrangement and configuration of the synchronization detection board 90 will be described later in FIGS. 6 and 7. The photosensor 91 mounted on the synchronization detection board 90 is arranged on a scan path of the laser beam from the optical writing device 20.

When the optical writing device 20 scans the photoconductor drum 30 with the laser beam once, the photosensor 91 detects the laser beam immediately before or after the scan, and outputs a synchronization signal. The photosensor 91 includes a semiconductor element, such as a photodiode, that produces a current when receiving light. As illustrated in FIG. 4, the photosensor 91 includes a lens 91*a*, a light receiver 91*b*, and a comparator. To increase the detection accuracy, the photosensor 91 may be provided with slits for reducing disturbance light and limiting a direction in which the beam is incident on the photodetector element.

The lens 91*a* is an optical member for narrowing the direction of the incident light. The light receiver 91*b* produces a current in response to the laser beam being incident thereon, and amplifies the current with a built-in operational amplifier circuit.

The amplified current flows through a variable gain resistance (described below), and serves as the detection signal of the photosensor 91. The comparator compares the detection signal, which has an analog value, with a predetermined constant voltage (threshold illustrated in FIGS. 5A and 5B), and converts the detection signal into an output signal (synchronization signal) having a digital value that indicates a period for which the detection signal exceeds the constant voltage as a detection period for which the laser beam is detected. In the example illustrated in FIGS. 5A and 5B, the output signal (synchronization signal) has a low level in a period for which the detection signal exceeds the constant voltage (threshold) and has a high level in a period for which the detection signal does not exceed the constant voltage (threshold).

The photosensor 91 outputs the output signal (synchronization signal) having the digital value to the control device 10. Based on the synchronization signal output from the photosensor 91, the control device 10 determines the write start timing of the laser beam onto the photoconductor drum 30 by the optical writing device 20.

Configuration of Optical Writing Device

Figure 6:
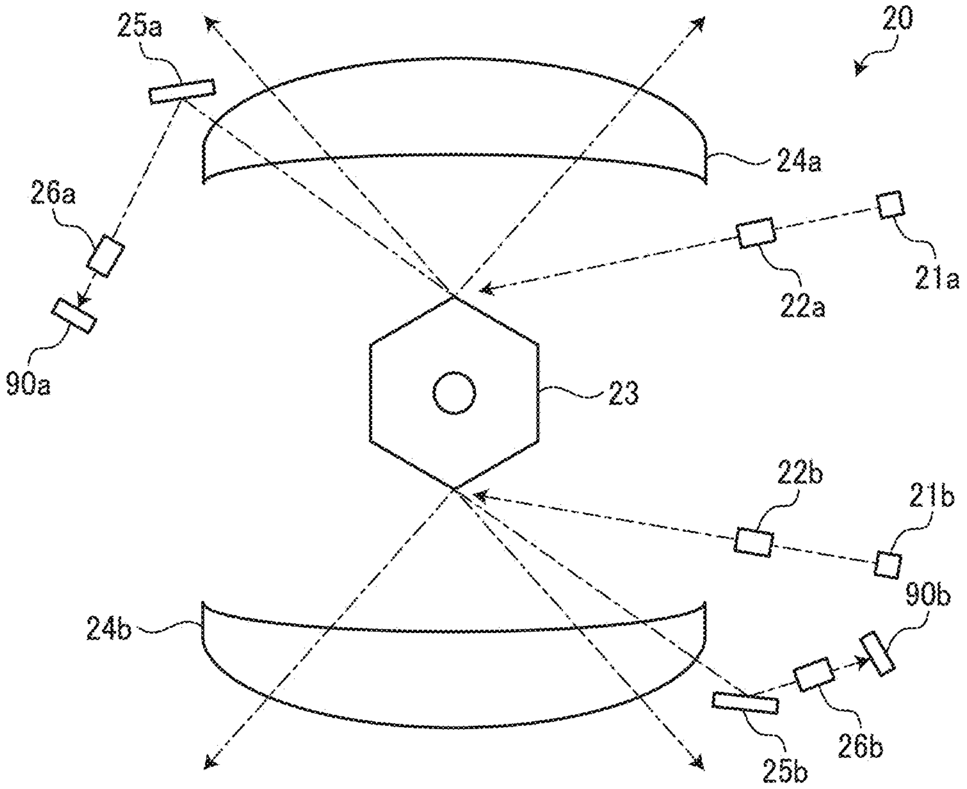
FIG. 6 is a diagram illustrating an example of a configuration of an optical writing device of the image forming apparatus according to the embodiment.
Figure 7:
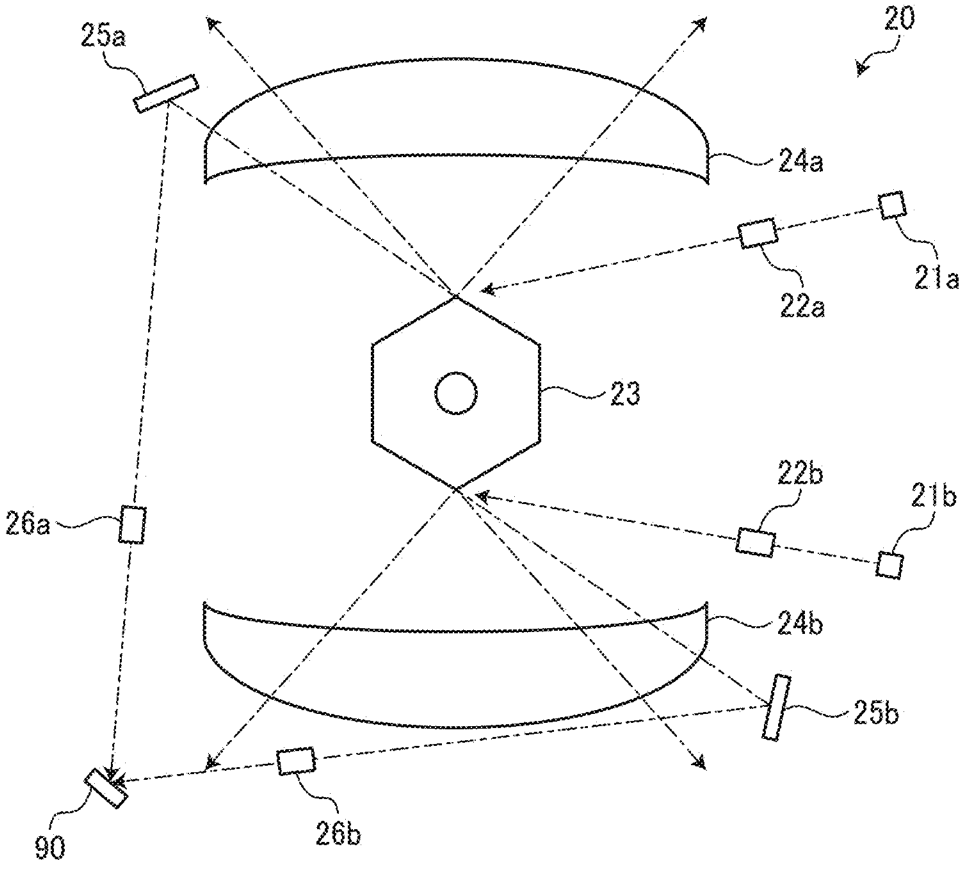
FIG. 7 is a diagram illustrating another example of the configuration of the optical writing device of the image forming apparatus according to the embodiment.

FIG. 6 is a diagram illustrating an example of a configuration of the optical writing device of the image forming apparatus according to the embodiment. FIG. 7 is a diagram illustrating another example of the configuration of the optical writing device of the image forming apparatus according to the embodiment. The configuration of the optical writing device 20 of the image forming apparatus 1 according to the present embodiment will be described with reference to FIGS. 6 and 7.

As illustrated in FIG. 6, the optical writing device 20 includes laser diodes 21*a* and 21*b* (each an example of a light-emitting element), lenses 22*a* and 22*b*, a polygon mirror 23 (deflector), fθ lenses 24*a* and 24*b*, mirrors 25*a* and 25*b*, and lenses 26*a* and 26*b*. The optical writing device 20 further includes a polygon motor 23*a* illustrated in FIG. 11 (described below).

The laser diodes 21*a* and 21*b* are each a unit that emits a laser beam. An operation of the laser diodes 21*a* and 21*b* for turning on and off the laser beam is controlled by light-emission control units 102 (described below), so that the light intensity of the laser beam is controlled. The laser beams emitted from the laser diodes 21*a* and 21*b* reach the respective photoconductor drums 30 through the respective optical systems (described later).

The lenses 22*a* and 22*b* use refraction to make the laser beams emitted from the laser diodes 21*a* and 21*b* in a parallel state, respectively.

The polygon mirror 23 is a polygonal-pillar-shaped rotatable polygon mirror that has a polygonal shape when viewed in a rotation axis direction and that is driven by the polygon motor 23*a* (described below) to rotate. The polygon mirror 23 rotates with a predetermined number of rotations per unit time, reflects (deflects) the laser beams incident thereon through the lenses 22*a* and 22*b* toward the fθ lenses 24*a* and 24*b* to repeatedly perform a scan in the main-scanning direction (the axial direction of the photoconductor drums 30), respectively. The laser beams scanned in the main-scanning direction by the rotation of the polygon mirror 23 are reflected by the mirrors 25*a* and 25*b* to be incident on synchronization detection boards 90*a* and 90*b* before or after scanning the photoconductor drums 30, respectively.

The fθ lenses 24*a* and 24*b* allow the laser beams, which have been reflected by the polygon mirror 23 and scanned at equal angular velocity, to be scanned onto the respective photoconductor drums 30 at an equal velocity. The laser beams are repeatedly scanned onto the respective photoconductor drums 30 in the main-scanning direction by the polygon mirror 23 and the fθ lenses 24*a* and 24*b*. Consequently, electrostatic latent images (latent images) according to the image data are formed on the respective photoconductor drums 30. The electrostatic latent image is formed to spread from the center of the photoconductor drum 30. An outer region where the image is not to be formed is treated as being outside the image region.

The mirrors 25*a* and 25*b* are members that reflect the laser beams, which are scanned in the main-scanning direction by the rotation of the polygon mirror 23, toward the lenses 26*a* and 26*b* before or after the laser beams are scanned onto the photoconductor drums 30, respectively.

The lenses 26*a* and 26*b* cause the laser beams reflected by the mirrors 25*a* and 25*b* to be incident on the synchronization detection boards 90*a* and 90*b*, respectively.

The synchronization detection boards 90*a* and 90*b*, each of which is the aforementioned synchronization detection board 90, are arranged outside the image region in the main-scanning direction of the laser beams onto the surfaces of the photoconductor drums 30 and on a start point side or an end point side in the main-scanning direction of the scan of the laser beams, respectively. The synchronization detection boards 90*a* and 90*b* each have the photosensor 91. The photosensor 91 detects the corresponding laser beam and outputs the synchronization signal to the control device 10.

As described above, the laser beams emitted from the laser diodes 21*a* and 21*b* reach the photoconductor drums 30 sequentially through the lenses 22*a* and 22*b*, the polygon mirror 23, and the fθ lenses 24*a* and 24*b* to form electrostatic latent images of respective colors on the photoconductor drums 30, respectively. The optical writing device 20 controls the light intensity of the laser beam to be constant while the laser beam from the laser diode 21 is scanned in one direction as illustrated in FIG. 3 above.

FIG. 6 described above illustrates two laser diodes, i.e., the laser diodes 21*a* and 21*b*. However, the optical writing device 20 includes laser diodes 21 individually for the respective colors. The respective laser diodes 21 emit the respective laser beams to different surfaces of the polygon mirror 23 or to the same surface of the polygon mirror 23 at different incident angles. The laser beams individually pass through the corresponding fθ lenses (in FIG. 6, the fθ lenses 24*a* and 24*b*), and scan the photoconductor drums 30 corresponding to the respective laser diodes 21. The optical writing device 20 includes the synchronization detection board 90 individually corresponding to each of the laser diodes 21. The photosensor 91 of each synchronization detection board 90 detects the laser beam from the laser diode 21 of the corresponding color, and outputs the synchronization signal for the corresponding color to the control device 10.

Note that the configuration of the optical writing device 20 illustrated in FIG. 6 is merely an example. The optical writing device 20 may include another optical system.

The synchronization signal may be shared for each scanning direction. For example, in FIG. 6, two scanning directions, i.e., one in which the laser beam is radiated above the polygon mirror 23 and the other in which the laser beam is radiated below the polygon mirror 23, are present. The four colors may be classified depending on which of the two directions the scanning direction corresponds to. For two colors having the common scanning direction, the write start timing may be determined based on the synchronization signal obtained by detecting the laser beam of one of the two colors. This can reduce the number of synchronization detection boards 90 from four to two.

Instead of the configuration of the optical writing device 20 illustrated in FIG. 6, the optical writing device 20 may include a single integrated synchronization detection board 90 as illustrated in FIG. 7. In the optical writing device 20 illustrated in FIG. 7, the laser beams from the two laser diodes 21*a* and 21*b* to be scanned to form the electrostatic latent images on the photoconductor drums 30 of different colors are incident on the single synchronization detection board 90 (i.e., the photosensor 91) at angles different from each other. This implements the single integrated synchronization detection board 90, resulting in reduced cost.

Configuration and Operation of Synchronization Detection Board

Figure 8A:
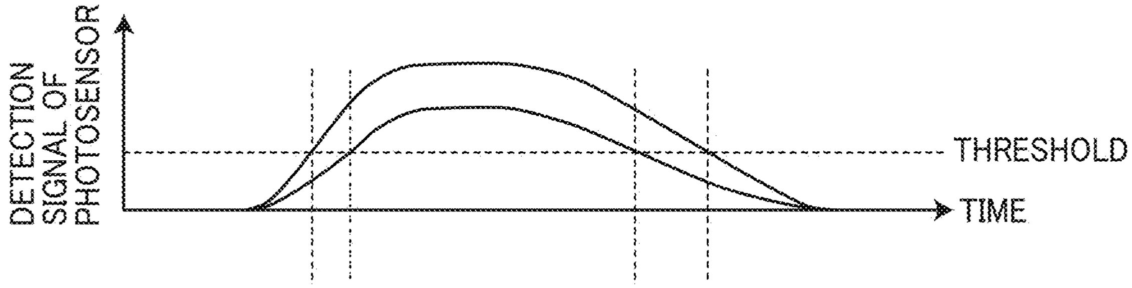
FIGS. 8A and 8B are diagrams each for describing an example of a relationship among light intensity of a laser beam incident on the photosensor of the image forming apparatus according to the embodiment, the detection signal, and the output signal.
Figure 8B:
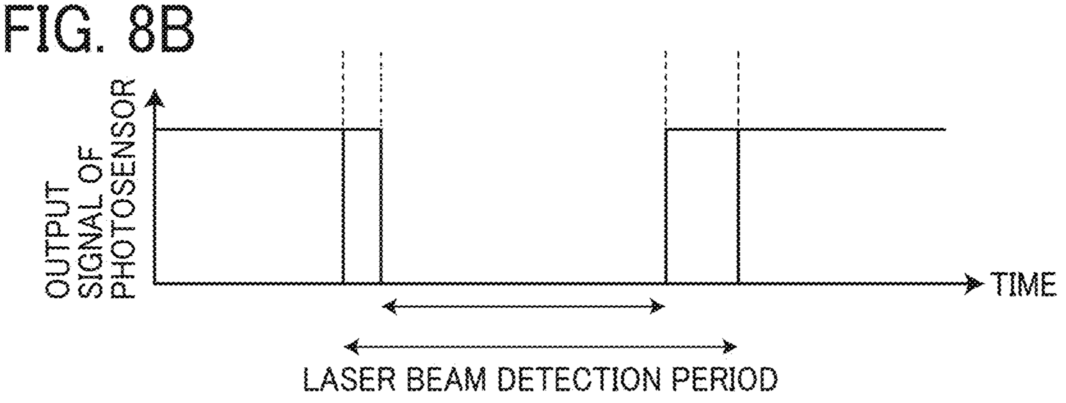
Figure 9:
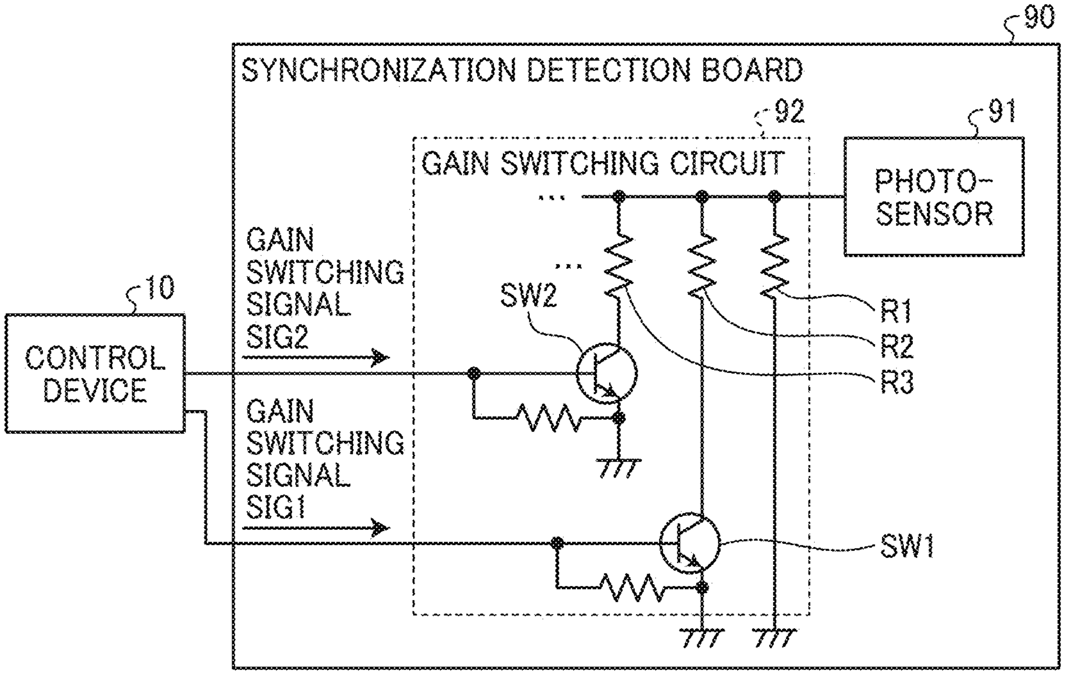
FIG. 9 is a diagram illustrating an example of a configuration of a synchronization detection board of the image forming apparatus according to the embodiment.
Figures 1, 10A:
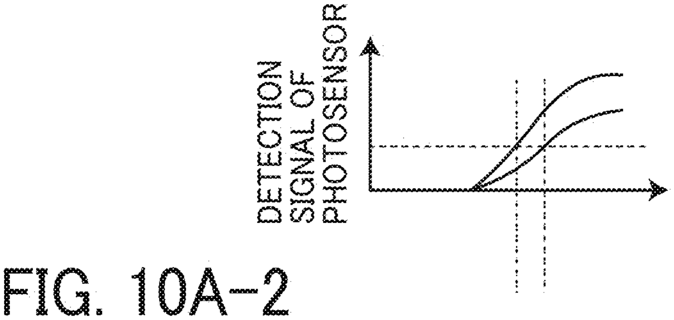
Figures 2, 10A:
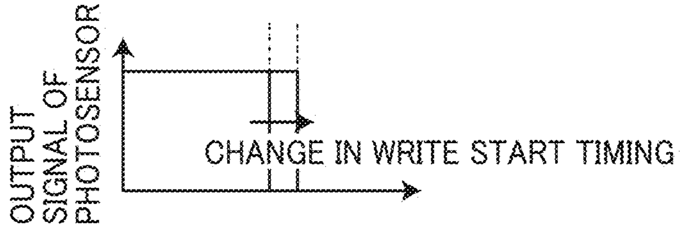

FIGS. 8A and 8B are diagrams each for describing an example of a relationship among the light intensity of a laser beam incident on the photosensor of the image forming apparatus according to the embodiment, the detection signal, and the output signal. FIG. 9 is a diagram illustrating an example of a configuration of the synchronization detection board of the image forming apparatus according to the embodiment. FIGS. 10A-1, 10-A2, and 10B are diagrams for describing a shift of the write start timing when a gain is switched in the image forming apparatus according to the embodiment. The configuration and the operation of the synchronization detection board 90 of the image forming apparatus 1 according to the present embodiment will be described with reference to FIGS. 8 to 10.

A variation in the light intensity of the laser beam incident on the photosensor 91 of the synchronization detection board 90 changes the detection signal. As illustrated in FIGS. 8A and 8B, when the light intensity of the laser beam is strong, the detection signal having an analog value is also large. When the light intensity of the laser beam is weak, the detection signal is small. As a result, the laser beam detection period for which the output signal of the photosensor 91 is at the low level widens or shrinks. The image forming apparatus 1 uses the falling edge or the rising edge of the output signal (synchronization signal) as the detection point of the laser beam incident on the photosensor 91. When the light intensity of the laser beam increases or decreases, the position of the edge varies, shifting the write start timing.

As illustrated in FIG. 4, inclination of the angle of the laser beam incident on the photosensor 91 makes the detection signal of the photosensor 91 asymmetric and distorted. In this case, when the light intensity of the laser beam is increased or decreased, amounts of change in the output signal on the rising edge side and the falling edge side are uneven. Consequently, the timing to be set as the reference of the detection timing of the laser beam is not to be determined, making it difficult to suppress the shift of the write start timing caused by the change in the light intensity of the laser beam incident on the photosensor 91.

The assembly of the components of the optical writing device 20 also has a variation. For example, a slight change in the installation angle of the synchronization detection board 90 may change the angle at which the laser beam is incident on the photosensor 91. This changes the amounts of change in the output signal on the rising edge side and the falling edge side (right side) when the light intensity of the laser beam is increased or decreased, and the shift of the write start timing may vary for each optical writing device 20.

The present embodiment provides a configuration that successfully corrects the shift of the write start timing appropriately even when the shift of the write start timing is caused by any one of the factors as described above.

As illustrated in FIG. 9, the synchronization detection board 90 includes the photosensor 91 and a gain switching circuit 92 (sensitivity switching circuit). Based on two gain switching signals SIG1 and SIG2 input from the control device 10, the gain switching circuit 92 switches the gain for adjusting the detection sensitivity of the photosensor 91. The gain switching circuit 92 includes resistors R1, R2, and R3, and switching elements SW1 and SW2.

In such a synchronization detection board 90, a gain resistance value of the photosensor 91 is switched based on the two gain switching signals SIG1 and SIG2 input from the control device 10 (signals to be input to respective bases of the switching elements SW1 and SW2). In the synchronization detection board 90 illustrated in FIG. 9, the gain resistance value is equal to the value of the resistor R1 when the two gain switching signals SIG1 and SIG2 input from the control device 10 both have low-level voltages, for example. The gain resistance is equal to a resistance of the resistor R1 and the resistor R2 connected in parallel, i.e., a value $(1/(1/R1+1/R2)<R1)$ when the gain switching signal SIG1 to be input to the base of the switching element SW1 from the control device 10 has a high-level voltage and the gain switching signal SIG2 to be input to the base of the switching element SW2 has the low-level voltage. The gain resistance is equal to a resistance of the resistors R1, R2, and R3 connected in parallel, i.e., a value $(1/(1/R1+1/R2+1/R3)<1/(1/R1+1/R2))$ when the two gain switching signals SIG1 and SIG2 input from the control device 10 both have the high-level voltages.

The gain switching circuit 92 illustrated in FIG. 9 is an external circuit of the photosensor 91. However, the configuration is not limited to this one, and the gain switching circuit 92 may be built in the photosensor 91. The description below is given on assumption that the gain switching circuit 92 is an external circuit of the photosensor 91.

When the photosensor 91 has a gain (sensitivity) switching function, the gain switching is not limited to that based on the gain switching signals of the high-level voltage or the low-level voltage illustrated in FIG. 9. The gain may be switched based on a command-format control signal, for example.

The gain switching circuit 92 illustrated in FIG. 9 includes a parallel circuit of resistors. However, the configuration is not limited to this one. The gain may be switched by a combination also including a series circuit of resistors.

Figure 10B:
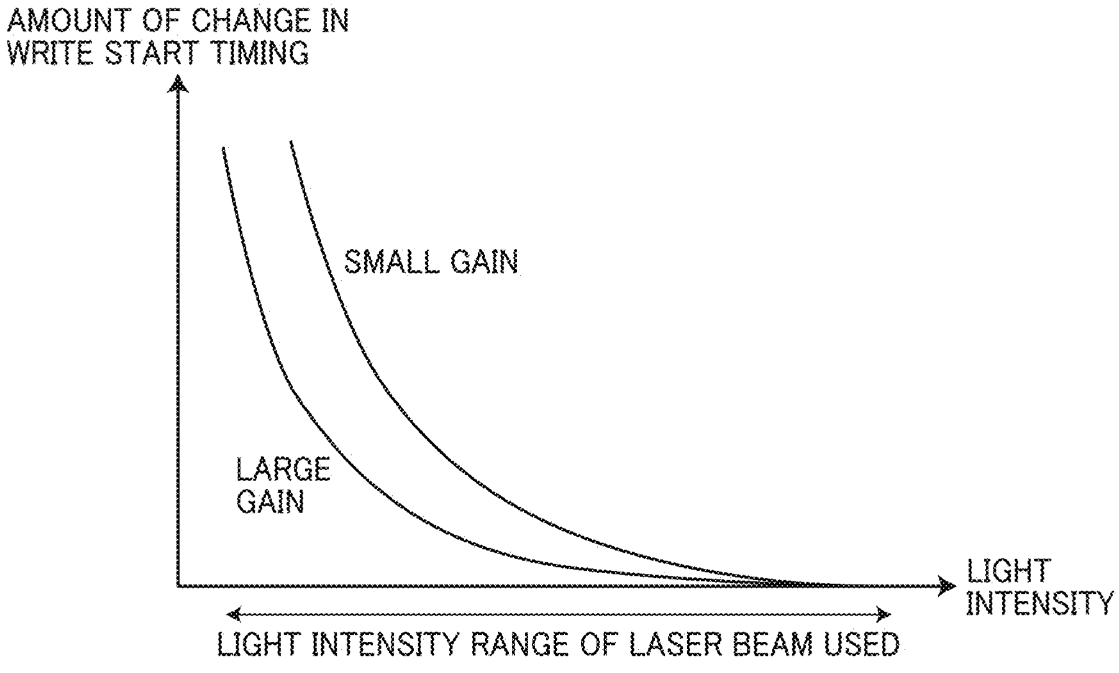

As illustrated in FIGS. 10A-1 and 10A-2, when the light intensity of the laser beam incident on the photosensor 91 changes, the rising edge and the falling edge of the output signal of the photosensor 91 shift. This changes the write start timing. When the amount of this change in the write start timing is represented by a graph, a non-linear graph is obtained as illustrated in FIG. 10B. When the light intensity is small, the detection signal of the photosensor 91 peaks at a value close to a reference voltage. Thus, the sensitivity to the change in light intensity is high, and the amount of change in the write start timing is sufficiently large. In contrast, when the light intensity is large, the detection signal of the photosensor 91 peaks at a value greater than the reference voltage. Thus, the sensitivity to the change in light intensity is low, and the amount of change in the write start timing is small. As illustrated in FIG. 10B, the amount of change in the write start timing has a curve (graph) that varies depending on the sensitivity (gain) of the photosensor 91. When the sensitivity (gain) is high (large), the detection signal of the photosensor 91 has a larger value and the peak value easily reaches the reference voltage. Thus, as illustrated in FIG. 10B, the graph of the amount of change in the write start timing (graph labeled as large gain illustrated in FIG. 10B) shifts leftward. In contrast, when the sensitivity (gain) is low (small), the detection signal of the photosensor 91 has a smaller value and the peak value less easily reaches the reference voltage. Thus, the graph of the amount of change in the write start timing (graph labeled as small gain illustrated in FIG. 10B) shifts rightward. As described above, switching the sensitivity (gain) of the photosensor 91 changes the graph of the amount of change in the write start timing.

In general, the magnitude of the voltage of the detection signal of the photosensor 91 of the synchronization detection board 90 is proportional to the product of a light intensity P of an incident laser beam and a gain resistance value G. Thus, the voltage of the detection signal when the gain resistance value G is constant and the light intensity P of the incident laser beam is multiplied by a is equal to the voltage of the detection signal when the light intensity P of the incident laser beam is constant and the gain resistance value G is multiplied by $\alpha$. The image forming apparatus 1 according to the present embodiment uses this feature. Specifically, when the light intensity of the laser beam incident on the photosensor 91 changes in a specific range, the image forming apparatus 1 changes (switches) the gain (sensitivity) of the photosensor 91 instead of changing the light intensity of the laser beam to estimate the amount of change in the write start timing without changing the light intensity of the laser beam during the use of the image forming apparatus 1. Since this allows an amount-of-change calculation pattern (described later) to be formed with no change in the light intensity of the laser beam, the amount of change in the write start timing can be estimated with high accuracy in the entire range of the light intensity of the laser beam used in the image forming apparatus 1.

Configuration and Operation of Functional Blocks of Control Device

Figure 11:
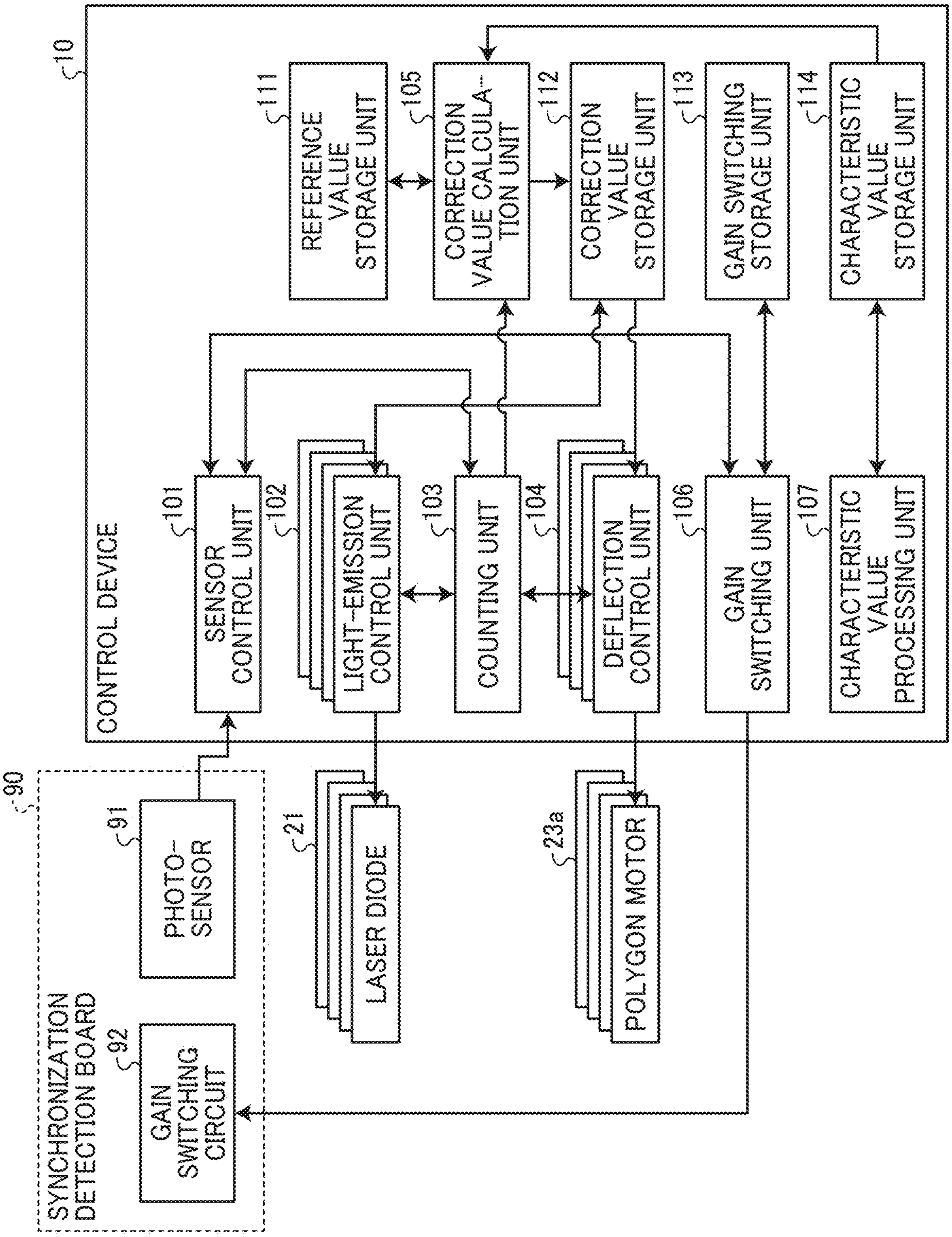
FIG. 11 is a diagram illustrating an example of a configuration of functional blocks of a control device of the image forming apparatus according to the embodiment.
Figure 16:
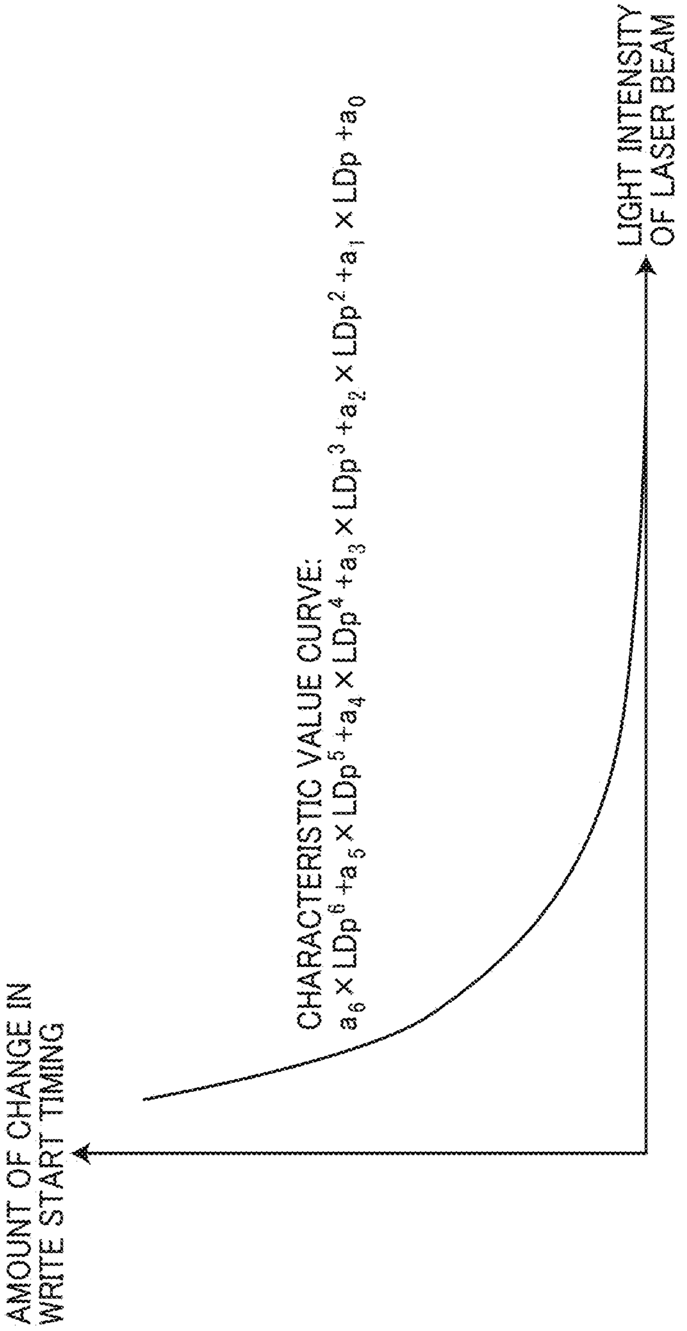
FIG. 16 is a diagram illustrating an example of a polynomial characteristic value curve.

FIG. 11 is a diagram illustrating an example of a configuration of functional blocks of the control device of the image forming apparatus according to the embodiment. FIGS. 12A, 12B-1, and 12B-2 are diagrams for describing gain switching in the synchronization detection board of the image forming apparatus according to the embodiment to prevent erroneous detection of stray light. FIGS. 13A, 13B-1, and 13B-2 are diagrams for describing gain switching in the synchronization detection board of the image forming apparatus according to the embodiment to prevent missed detection. FIGS. 14A and 14B are diagrams illustrating an example of a characteristic value table. FIG. 15 is a diagram for describing an example of a usage method of the characteristic value table. FIG. 16 is a diagram illustrating an example of a polynomial characteristic value curve. FIG. 17 is a diagram for describing how a resistance for determining a gain resistance value of the photosensor is determined. The configuration and the operation of the functional blocks of the control device 10 of the image forming apparatus 1 according to the present embodiment will be described with reference to FIGS. 11 to 17.

As illustrated in FIG. 11, the control device 10 includes a sensor control unit 101, the light-emission control units 102, a counting unit 103, deflection control units 104, a correction value calculation unit 105 (correction unit), a gain switching unit 106 (sensitivity switching unit), a characteristic value processing unit 107 (updating unit), a reference value storage unit 111, a correction value storage unit 112, a gain switching storage unit 113, and a characteristic value storage unit 114.

The sensor control unit 101 is a functional unit that controls operations of the photosensor 91. The sensor control unit 101 receives the synchronization signal output when the photosensor 91 detects a laser beam.

The light-emission control units 102 are functional units each of which controls on/off of the laser diode 21 (light-emitting element) and adjusts the light intensity of the laser beam emitted by the laser diode 21. Specifically, in accordance with a count-up signal from the counting unit 103 based on the synchronization signal received by the sensor control unit 101, each of the light-emission control units 102 transfers, to the corresponding laser diode 21, a turn-on signal and a turn-off signal according to image data to form an electrostatic latent image on the corresponding photoconductor drum 30. The transfer start timing of this signal is referred to as the write start timing described above. Some techniques change the light intensity of the laser beam at a specific timing in a laser beam scan. However, in the present embodiment, to reduce the manufacturing cost, the laser beam is emitted with the light intensity thereof kept constant by each of the light-emission control units 102 over the entire period of the laser beam scan.

The counting unit 103 is a functional unit that automatically counts up an internal count value when the sensor control unit 101 receives the synchronization signal from the photosensor 91. Specifically, the counting unit 103 resets the internal count value when the sensor control unit 101 starts receiving the synchronization signal. In response to the count-up count value reaching a predetermined value, the counting unit 103 outputs a signal to the light-emission control units 102. The predetermined value is determined by a sum of a reference value and a correction value for a scanning direction shift (main-scanning shift) of each color. The reference value is determined based on arrangements of the photoconductor drum 30 and the photosensor 91. The correction value for the scanning direction shift (main-scanning shift) is stored in the correction value storage unit 112. Each of the light-emission control units 102 reads the correction value from the correction value storage unit 112 before image formation is started by emission of the laser beam from the laser diode 21.

The deflection control units 104 are functional units each of which controls the polygon motor 23*a* to control rotation of the polygon mirror 23 to scan the photoconductor drum 30 in the main-scanning direction with the laser beam emitted from the laser diode 21.

The correction value calculation unit 105 is a functional unit that calculates a correction value by color shift correction. The correction value calculation unit 105 updates the correction value stored in the correction value storage unit 112 with the calculated correction value. Such a configuration allows the shift of the write start timing of the laser beam to be corrected by the correction value calculated by color shift correction based on a color matching operation, an electrostatic latent image to be formed at the intended position on the photoconductor drum 30, and a high-quality image to be formed.

The gain switching unit 106 is a functional unit that outputs the gain switching signals to the gain switching circuit 92 of the synchronization detection board 90 to switch the gain of the photosensor 91. When the gain is switched, the gain switching unit 106 stores information on the gain (e.g., the gain resistance value or the levels of the gain switching signals) in the gain switching storage unit 113.

Figure 12A:
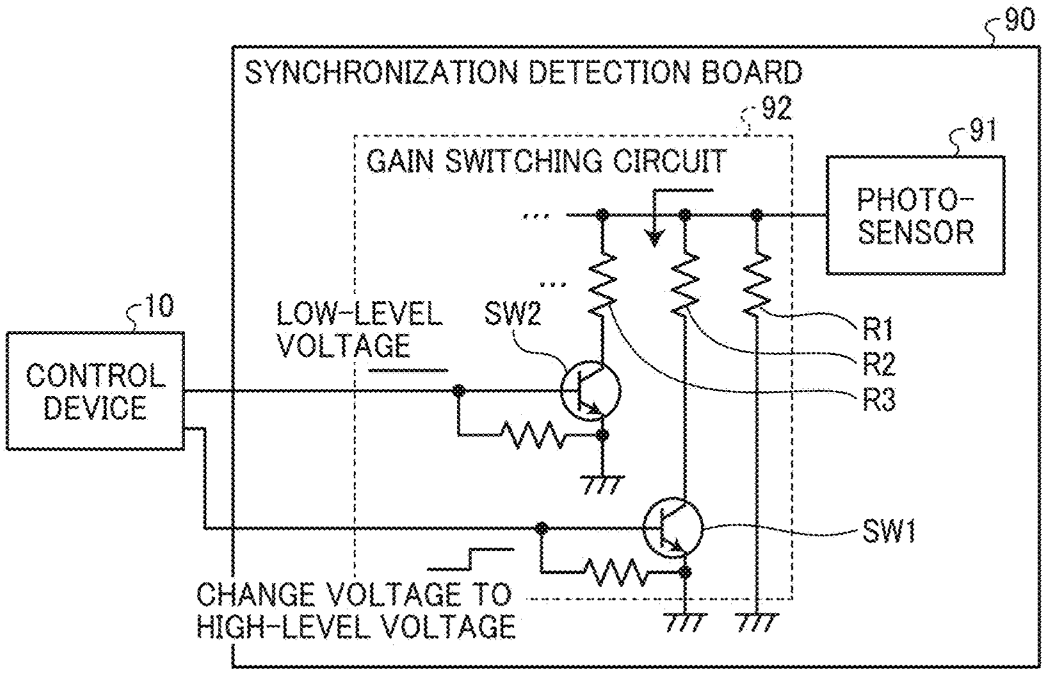
Figures 1, 12B:
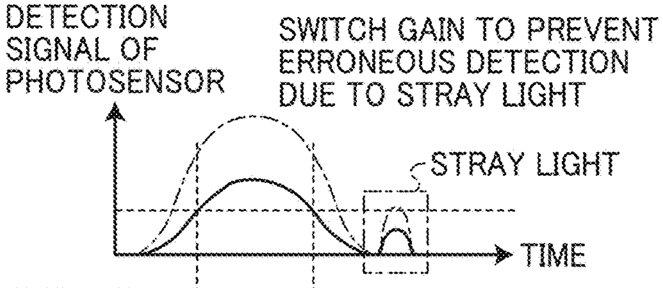
Figures 2, 12B:
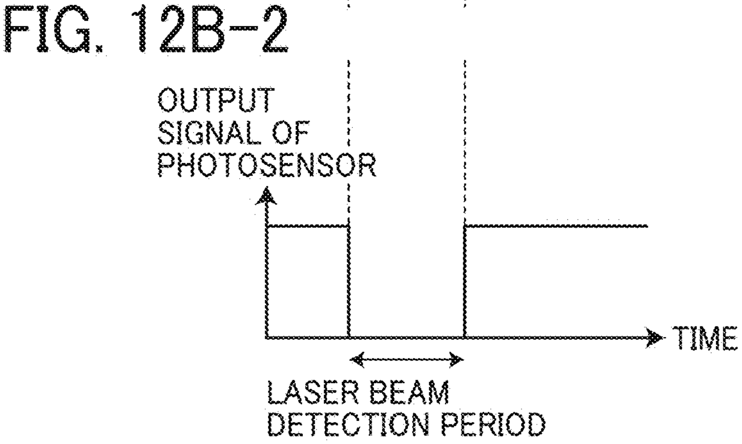

FIGS. 12B-1 and 12B-2 illustrate an operation to be performed when the light intensity of the laser beam incident on the photosensor 91 further increases. When the light intensity of the laser beam incident on the photosensor 91 is excessively large, the laser beam is detected at a timing not supposed to be detected because of the influence of stray light. This consequently causes a malfunction. In this case, the gain switching unit 106 decreases the gain of the photosensor 91 (e.g., by setting the gain switching signal SIG1 at the high level and the gain switching signal SIG2 at the low level as illustrated in FIG. 12A) to reduce the voltage of the detection signal and avoid detecting the stray light as illustrated in FIGS. 12B-1 and 12B-2.

Figure 13A:
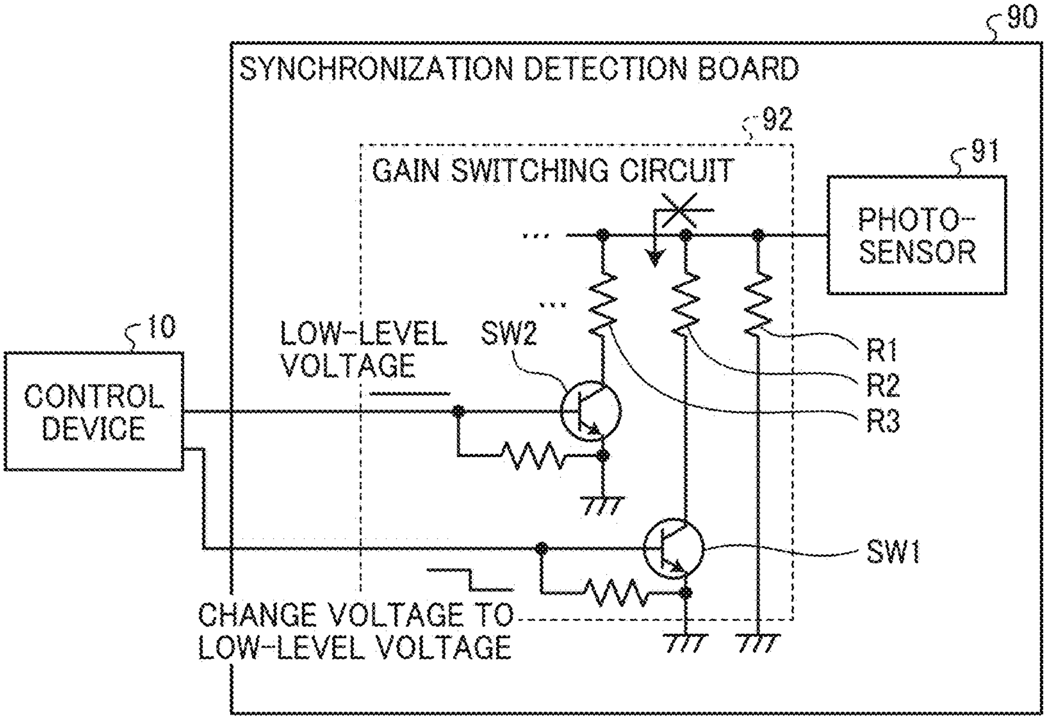
Figures 1, 13B:
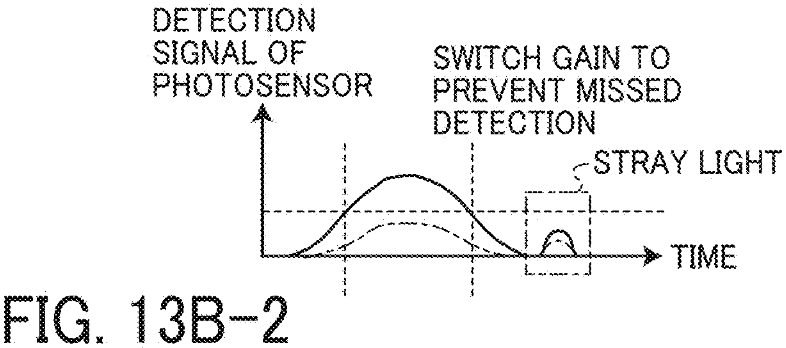
Figures 2, 13B:
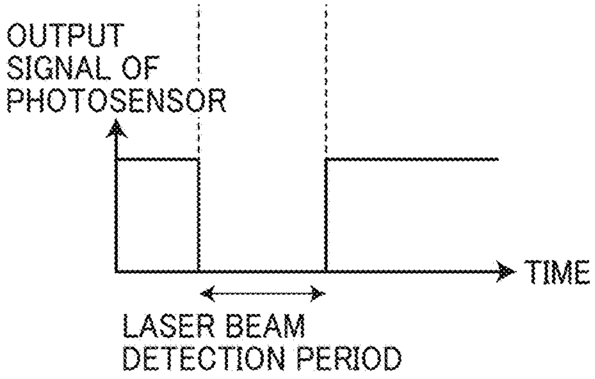

In contrast, FIGS. 13B-1 and 13B-2 illustrate an operation to be performed when the light intensity of the laser beam incident on the photosensor 91 further decreases. When the light intensity of the laser beam incident on the photosensor 91 is excessively small, the detection signal having an analog value no longer reaches the constant voltage (threshold) of the comparator. This consequently causes a malfunction because detection of the laser beam fails. In this case, the gain switching unit 106 increases the gain of the photosensor 91 (e.g., by setting the gain switching signal SIG1 at the low level and the gain switching signal SIG2 at the low level as illustrated in FIG. 13A) to raise the voltage of the detection signal and successfully detect the laser beam as illustrated in FIGS. 13B-1 and 13B-2.

As illustrated in FIGS. 10A-1, 10A-2, and 10B, when the gain of the photosensor 91 is switched, the graph of the amount of change in the write start timing changes. To define such a graph of the amount of change in the write start timing, information on a characteristic value table (described later) or characteristic value curve (described later) corresponding to each gain is stored in the characteristic value storage unit 114. The correction value calculation unit 105 uses the information on the characteristic value table or characteristic value curve stored in the characteristic value storage unit 114 to calculate a correction amount for the shift of the write start timing at each gain.

The shift of the write start timing to be corrected by the correction value calculation unit 105 is a minute shift on the order of several tens [μm]. Thus, the minute shift may be ignored unless highly accurate color matching is desired as in the print operation. In this case, in the ordinary usage method of the image forming apparatus 1, the characteristic value storage unit 114 may store the information on the characteristic value table or characteristic value curve corresponding to the gain of the photosensor 91 used in a limited operation in which highly accurate color matching is desired as in the print operation. This can minimize the in-use memory area of the characteristic value storage unit 114 and reduce the increase in cost of the component.

The characteristic value processing unit 107 is a functional unit that calculates an amount of change in the write start timing at each gain, estimates a curve of the write start timing, and updates the information on the characteristic value table or characteristic value curve stored in the characteristic value storage unit 114 in accordance with the estimated curve. Hereinafter, the characteristic value table or the characteristic value curve may be collectively referred to as "characteristic value information".

FIG. 14A illustrates an example of the characteristic value table that is tabular information in which the light intensity of the laser beam incident on the photosensor 91 is associated with the amount of change in the write start timing corresponding to the laser diodes 21*a* and 21*b*. The characteristic value table is prepared for each laser beam (color) of a different path. Note that the common characteristic value table may be used for laser beams (colors) having the common scanning direction. This can reduce the consumed memory. When the light intensity of the laser beam is determined by a density adjustment operation or the like of the image forming apparatus 1, the correction value calculation unit 105 calculates the amount of change in the write start timing corresponding to the light intensity and calculates the correction value in accordance with the characteristic value table illustrated in FIG. 14A. For example, when the image forming apparatus 1 operates with the light intensity of the laser beam of the laser diode 21*a* set to 1.3 [mW] and the light intensity of the laser beam of the laser diode 21*b* set to 1.1 [mW], the write start timing of the laser diode 21*a* is delayed by 8.640 [ns] and the write start timing of the laser diode 21*b* is earlier by 2.526 [ns]. The use of such a characteristic value table allows the correction value calculation unit 105 to calculate the amount of change in the write start timing even when the light intensities of the laser diodes 21 are set differently. The correction value calculation unit 105 corrects the calculated amount of change in the write start timing, so that a high-quality image can be provided. Note that the characteristic value table may be a table in which a ratio (light intensity ratio) of the light intensity of the laser beam incident on the photosensor 91 to a reference light intensity is associated with the amounts of change in the write start timing corresponding to the laser diodes 21*a* and 21*b* as illustrated in FIG. 14B.

The usage method of the characteristic value table in the image forming apparatus 1 will be described in detail with reference to FIG. 15. A shift between colors in the image forming apparatus 1 is corrected in color matching. A color matching pattern is formed on the transfer belt 40, and is detected by the density detector 45. At this time, the image forming apparatus 1 causes the laser beams to be emitted at a specific light intensity to form the color matching pattern. The write start timing is determined relative to the output signal of the photosensor 91. The change in the light intensity of the laser beam causes a shift in the write start timing. When the color matching pattern is formed, the write start timing shifts in accordance with the light intensity at that time. However, since color matching is performed in the shifted state, the correction value calculated by the correction value calculation unit 105 by color matching includes a correction value for the amount of change in the write start timing. For example, in FIG. 15, when the light intensity of the laser beam of the laser diode 21*a* is 4.1 [mW] at the time of color matching, the write start timing is shifted by 32.542 [ns]. As the correction value calculated by the color matching, a correction value for correcting the shift of 32.542 [ns] is calculated. Thus, when the light intensity of the laser beam of the laser diode 21*a* is the same, i.e., 4.1 [mW] at the time of the normal print operation, no change occurs in the write start timing due to a change in the light intensity. On the other hand, when the light intensity of the laser beam of the laser diode 21*a* changes from 4.1 [mW] at the time of the normal print operation, the amount of change in the write start timing also changes from 32.542 [ns].

Accordingly, in the present embodiment, the control device 10 stores the light intensity of the laser beam as a color matching operation condition when color matching is completed successfully. The control device 10 corrects the write start timing so as to cancel out (eliminate) a difference between the amount of change in the write start timing caused when the operation is performed with the light intensity set for the print operation and the amount of change in the write start timing caused when the operation is performed with the light intensity set for the color matching. For example, in the case of the example of FIG. 15, when the light intensity of the laser beam of the laser diode 21*a* is 4.1 [mW] in the color matching, and the light intensity is 3.8 [mW] in the print operation, the correction value calculation unit 105 calculates the correction value for 0.862 [ns] which is the difference between the amounts of change in the write start timing corresponding to the two respective light intensities in the characteristic value table to correct the write start timing of the laser diode 21*a*. When the light intensity of the laser beam of the laser diode 21*b* is 4.2 [mW] in the color matching, and the light intensity is 4.0 [mW] in the print operation, the correction value calculation unit 105 calculates the correction value for −0.463 [ns] which is the difference between the amounts of change in the write start timing corresponding to the two respective light intensities in the characteristic value table to correct the write start timing of the laser diode 21*b*.

The examples illustrated in FIGS. 14A to 15 present correction of the write start timing using the characteristic value table as the characteristic value information. Alternatively, as illustrated in FIG. 16, the write start timing may be corrected using a polynomial characteristic value curve as the characteristic value information. For example, a polynomial approximation curve is calculated from the plots of the amounts of change in the write start timing (measurement results at several points) illustrated in FIG. 14A or 14B, and coefficients $a_0$ to $a_n$ (up to $a_6$ in FIG. 16) of the polynomial are determined. Thus, when a light intensity LDp of the laser beam is an input value, the control device 10 successfully calculates the amount of change in the write start timing using Expression (1) below. The polynomial characteristic value curve is also prepared for each laser beam (color) of a different path.

Amount of change in write start timing=

$$a_n \times Ldp^n + a_{n-1} \times Ldp^{n-1} + \ldots + a_1 \times Ldp + a_0 \quad (1)$$

The control device 10 stores the light intensity of the laser beam as a color matching operation condition when color matching is completed successfully. The control device 10 corrects the write start timing so as to cancel out (eliminate) a difference between the amount of change in the write start timing caused when the operation is performed with the light intensity set for the print operation and the amount of change in the write start timing caused when the operation is performed with the light intensity set for the color matching. For example, the coefficients of the characteristic value curve representing the amount of change in the write start timing are $a_0$=42.249, $a_1$=−62.972, $a_2$=24.779, $a_3$=−5.0273, $a_4$=0.4872, $a_5$=−0.0151, and $a_6$=−0.0003. When the light intensity of the laser beam of the laser diode 21*a* is 4.1 [mW] in the color matching and the light intensity of the laser beam of the laser diode 21*a* is 3.8 [mW] in the print operation, the amounts of change in the write start timing in the characteristic value curve are respectively calculated as −27.1360 [ns] and −26.3738 [ns] using Expression (1) above. The correction value calculation unit 105 makes a correction for −0.7622 [ns], which is the difference between these two amounts of change, to correct the write start timing of the laser diode 21*a*. As described above, the correction amount of the write start timing is calculated and the correction is made, so that the shift of the write start timing caused in the print operation is suppressed and a high-quality image can be provided. When the characteristic value curve is stored as the characteristic value information, just the coefficients of the polynomial are stored. This can reduce the consumed storage area than storing the characteristic value table as the characteristic value information.

The description will be given of a method for determining the values of the resistors R1 to R3 of the gain switching circuit 92 of the synchronization detection board 90 to allow the characteristic value processing unit 107 to estimate the curve of the amount of change in the write start timing with high accuracy. As described above, the sensitivity (gain) of the photosensor 91 is determined by the gain resistance value of the gain switching circuit 92. In the present embodiment, for example, the gain resistance value is roughly classified into two kinds as illustrated in FIG. 17. One is the gain resistance value to be used in updating processing of the information on the characteristic value table or characteristic value curve. The other is the gain resistance value to be used in the ordinary usage method of the image forming apparatus 1 and the updating processing. The gain resistance value to be used in the ordinary usage method of the image forming apparatus 1 is most significant. Thus, the gain resistance value serving as a reference is first determined. The maximum and minimum gain resistance values are then determined. When the curve of the amount of change in the write start timing is highly accurately estimated in a light intensity range of the laser beam incident on the photosensor 91, measurement results of the amount of change from end to end of the light intensity range are to be obtained. As described above, the voltage of the detection signal of the photosensor 91 is proportional to the product of the light intensity P of the incident laser beam and the gain resistance value G. Thus, to obtain the measurement results of the amount of change from end to end of the light intensity range of the incident light, the ratio of the gain resistance value is to be changed in accordance with the number of light intensity ratios. Accordingly, in the present embodiment, the gain resistance value is determined as follows. Let Ptyp denote the median light intensity of the laser beam. Let Pmax denote the maximum light intensity. Let Pmin denote the minimum light intensity. The maximum gain resistance value is selected to be close to the product of the reference gain resistance value and Pmax/Ptyp, which is the light intensity ratio. The minimum gain resistance value is selected to be close to the product of the reference gain resistance value and Pmin/Ptyp, which is the light intensity ratio. By selecting the resistors R1 to R3 to meet such gain resistance values, the curve of the amount of change in the write start timing can be highly accurately estimated in the entire light intensity range of the laser beam used in the image forming apparatus 1.

For example, the reference gain resistance value is 2.31 [kΩ]. When Pmax/Ptyp=1.3 (+30%) and Pmin/Ptyp=0.69 (−30%) of the reference gain resistance value are set, the maximum gain resistance value is 2.31 [kΩ]×1.3=3.00 [kΩ] and the minimum gain resistance value is 2.31 [kΩ]×0.69=1.59 [kΩ]. The values of the resistors R1, R2, and R3 that can set values close to the three gain resistance values (i.e., 2.31 [kΩ], 3.00 [kΩ], and 1.59 [kΩ]) by switching the gain switching signals for the gain switching circuit 92 between on and off are 3.0 [kΩ], 10.0 [kΩ], and 5.1 [kΩ], respectively.

The gain resistance values to be switched between in the characteristic value updating process (described later) include a value greater than or equal to a product of a ratio of the maximum light intensity to a reference light intensity and the gain resistance value to which the gain is switched in the print operation. The reference light intensity is the light intensity of the laser beam used in the print operation. The gain resistance values to be switched between in the characteristic value updating process (described later) further include a value less than or equal to a product of a ratio of the minimum light intensity to a reference light intensity and the gain resistance value to which the gain is switched in the print operation. The reference light intensity is the light intensity of the laser beam used in the print operation.

Lastly, it is considered whether gain switching is desirable in the ordinary usage method of the image forming apparatus 1. If gain switching is desirable, when the gain resistance values settable as the gain of the photosensor 91 with the resistors R1, R2, and R3 set to have the above values include a usable value, the value is selected. When the settable gain resistance values include no usable value, the resistors R1, R2, and R3 are insufficient. Thus, a circuit is added to the gain switching circuit 92 and a new gain switching signal is added to make a gain resistance value usable in the image forming apparatus 1 settable. The gain switching circuit 92 of the photosensor 91 is thus configured. Consequently, the curve of the amount of change in the write start timing can be highly accurately estimated by the updating processing of the characteristic value information performed by the characteristic value processing unit 107, the shift of the write start timing caused in the print operation can be reduced, and a high-quality image can be provided.

The gain switching signals used when the characteristic value processing unit 107 updates the characteristic value information are not necessarily different from the gain switching signals used in the ordinary usage method of the image forming apparatus 1. The gain (sensitivity) changes depending on the combinations of the gain switching signals. Thus, the gain to be used in the ordinary usage method of the image forming apparatus 1 may be selected from among the combinations.

The reference value storage unit 111 is a functional unit that stores the reference value described above. The reference value storage unit 111 is implemented, for example, by the ROM described above.

The correction value storage unit 112 is a functional unit that stores the correction value calculated by the correction value calculation unit 105. The correction value storage unit 112 is implemented, for example, by the ROM or RAM described above.

The gain switching storage unit 113 is a functional unit that stores information on the gain switched by the gain switching unit 106. The gain switching storage unit 113 is implemented, for example, by the ROM or RAM described above.

The characteristic value storage unit 114 is a functional unit that stores information on the characteristic value table or characteristic value curve. When the characteristic value processing unit 107 estimates the curve of the write start timing, the information on the characteristic value table or characteristic value curve in the characteristic value storage unit 114 is updated.

The sensor control unit 101, the light-emission control units 102, the counting unit 103, the deflection control units 104, the correction value calculation unit 105, the gain switching unit 106, and the characteristic value processing unit 107 described above are implemented by the CPU described above executing a program. At least part of the sensor control unit 101, the light-emission control units 102, the counting unit 103, the deflection control units 104, the correction value calculation unit 105, the gain switching unit 106, and the characteristic value processing unit 107 may be implemented by a hardware circuit such as a field-programmable gate array (FPGA) or an application-specific integrated circuit (ASIC).

Note that the functional units of the control device 10 illustrated in FIG. 11 conceptually present the functions, and the control device 10 is not limited to such a configuration. That is, the functional units of the control device 10 are not necessarily configured as clear software modules, i.e., the blocks illustrated in FIG. 11. As a result of the control device 10 executing a program, the functions of the functional units are implemented as a whole. For example, multiple functional units illustrated as independent functional units in the control device 10 illustrated in FIG. 11 may be configured as a single functional unit. Conversely, the function of a single functional unit in the control device 10 illustrated in FIG. 11 may be divided into multiple portions, which may be configured as multiple functional units.

Characteristic Value Updating Process of Image Forming Apparatus

Figure 19:
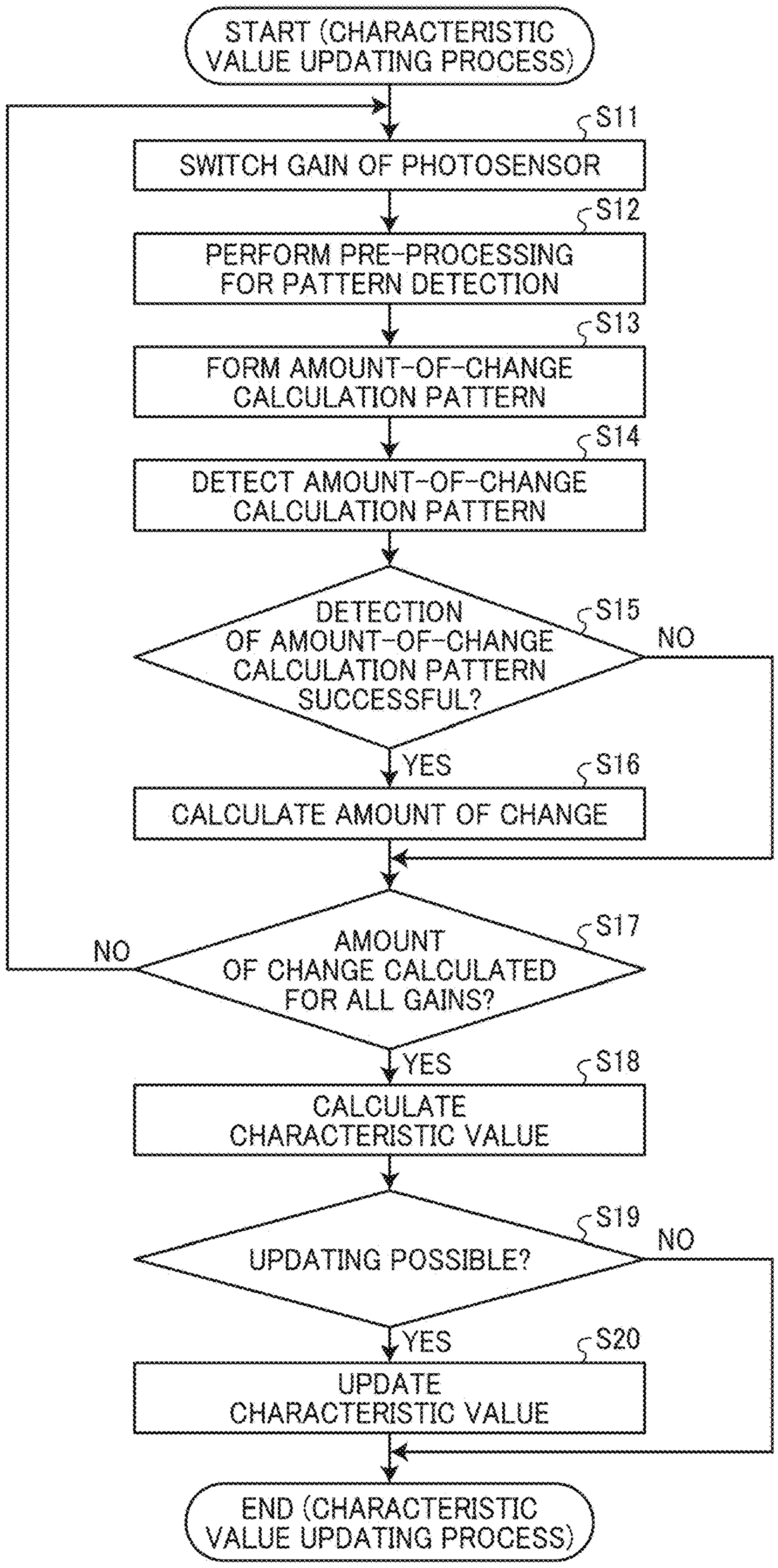
FIG. 19 is a flowchart illustrating an example of a flow of the characteristic value updating process of the image forming apparatus according to the embodiment.
Figure 20:
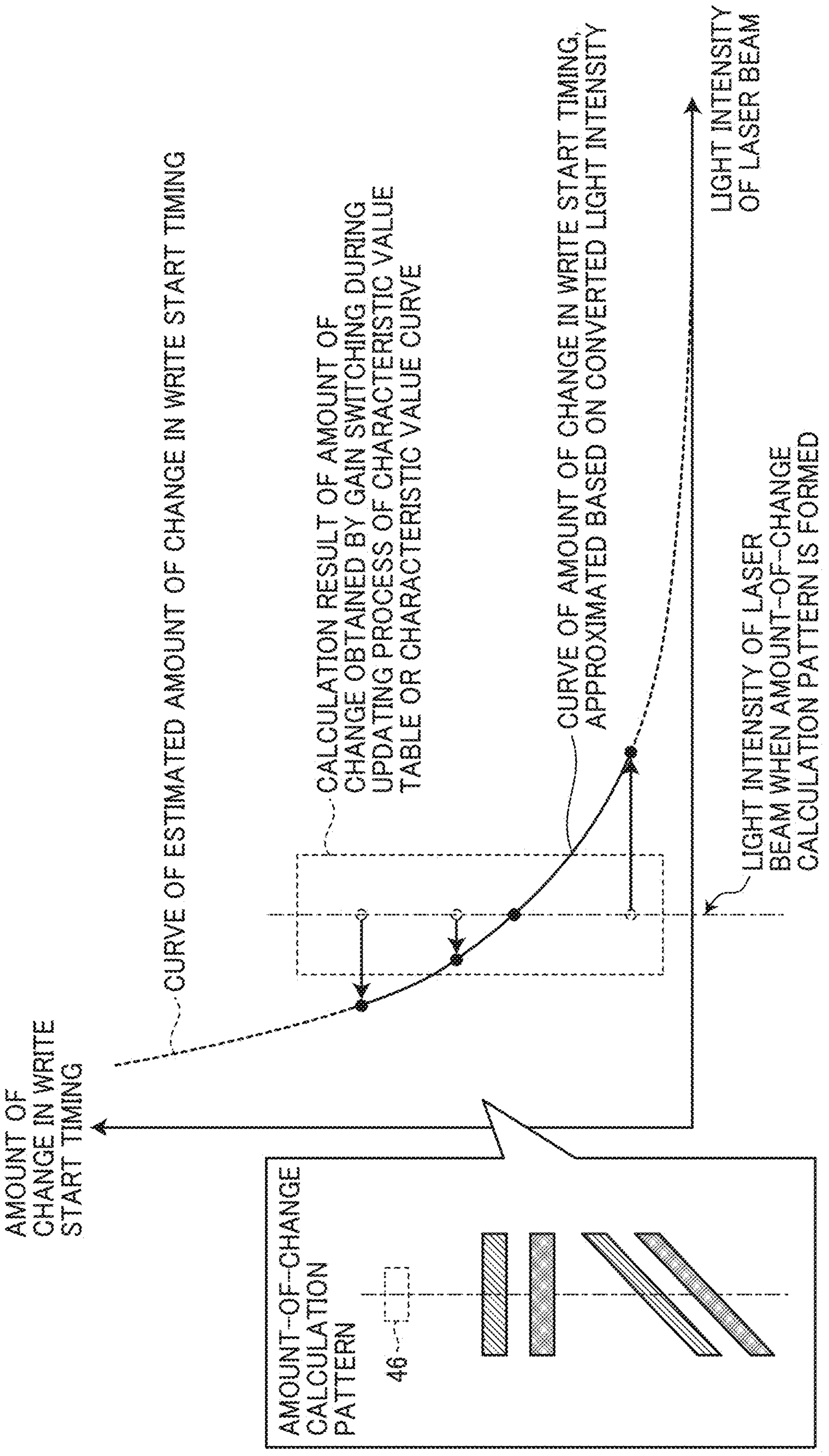
FIG. 20 is a diagram for describing an operation of estimating a curve of an amount of change in the write start timing, from a measurement result in the image forming apparatus according to the embodiment.
Figure 21:
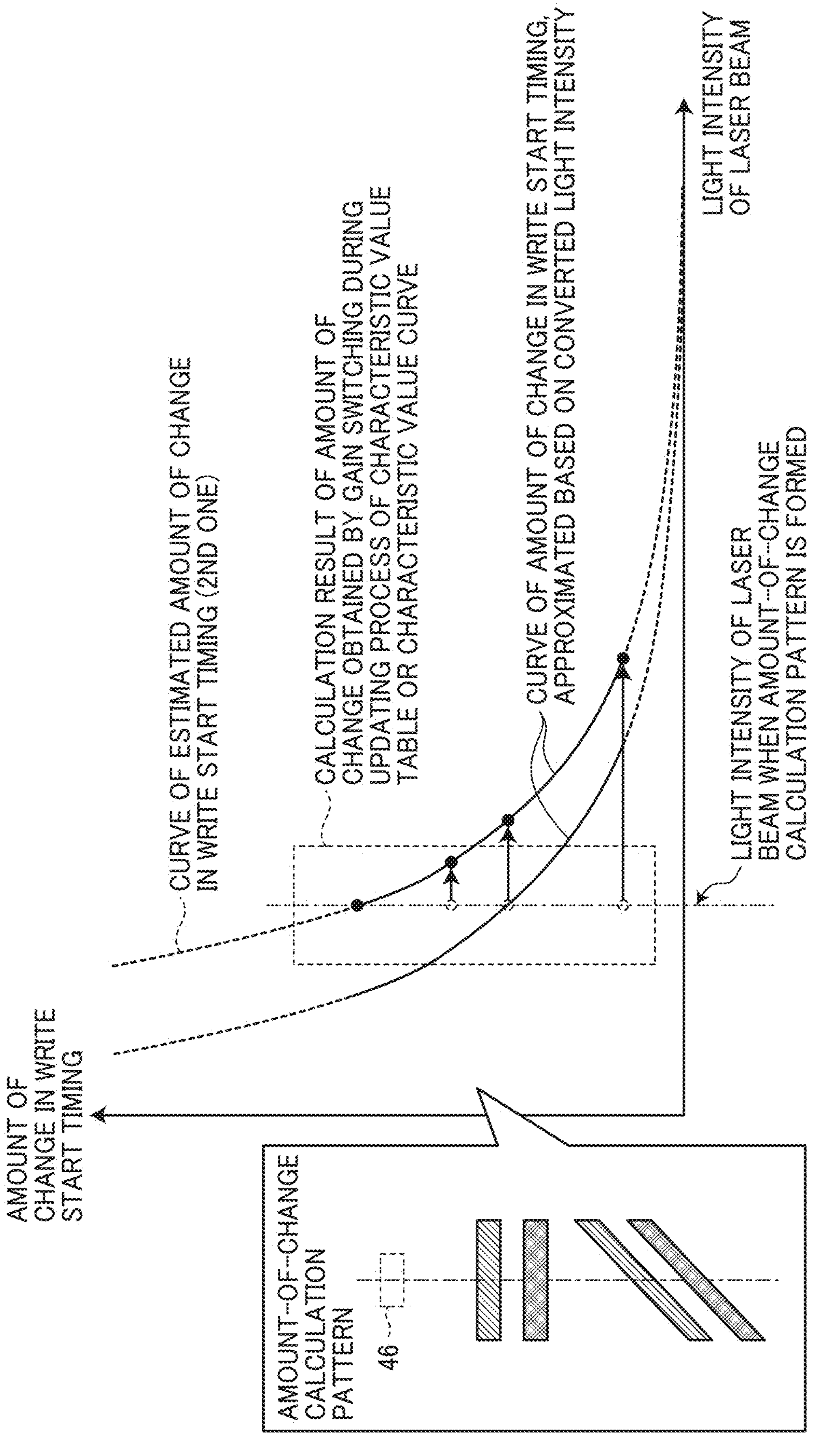
FIG. 21 is a diagram for describing an operation of estimating a (second) curve of the amount of change in the write start timing, from the measurement result in the image forming apparatus according to the embodiment.
Figure 22:
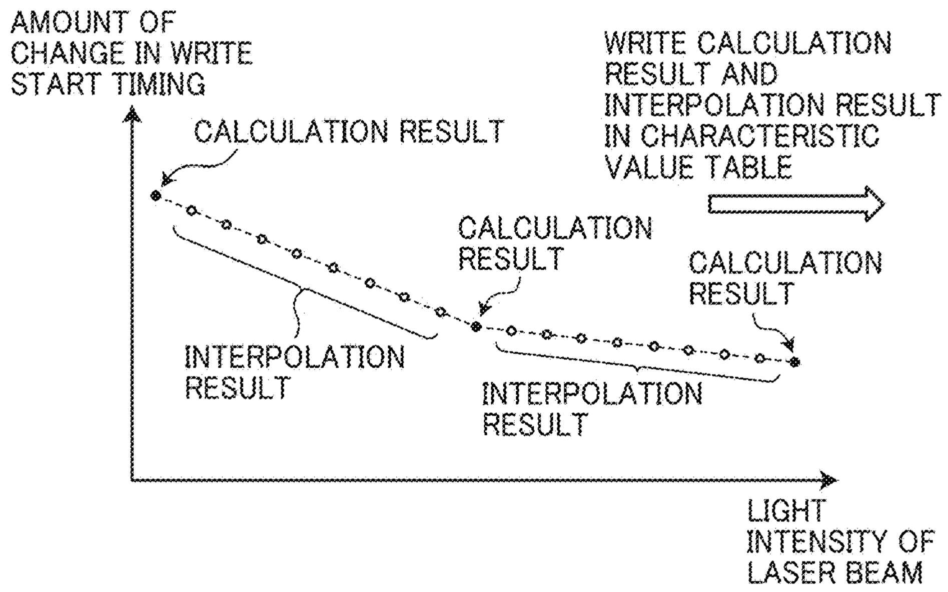
FIG. 22 is a diagram for describing updating of the characteristic value table in the image forming apparatus according to the embodiment.
Figure 23:
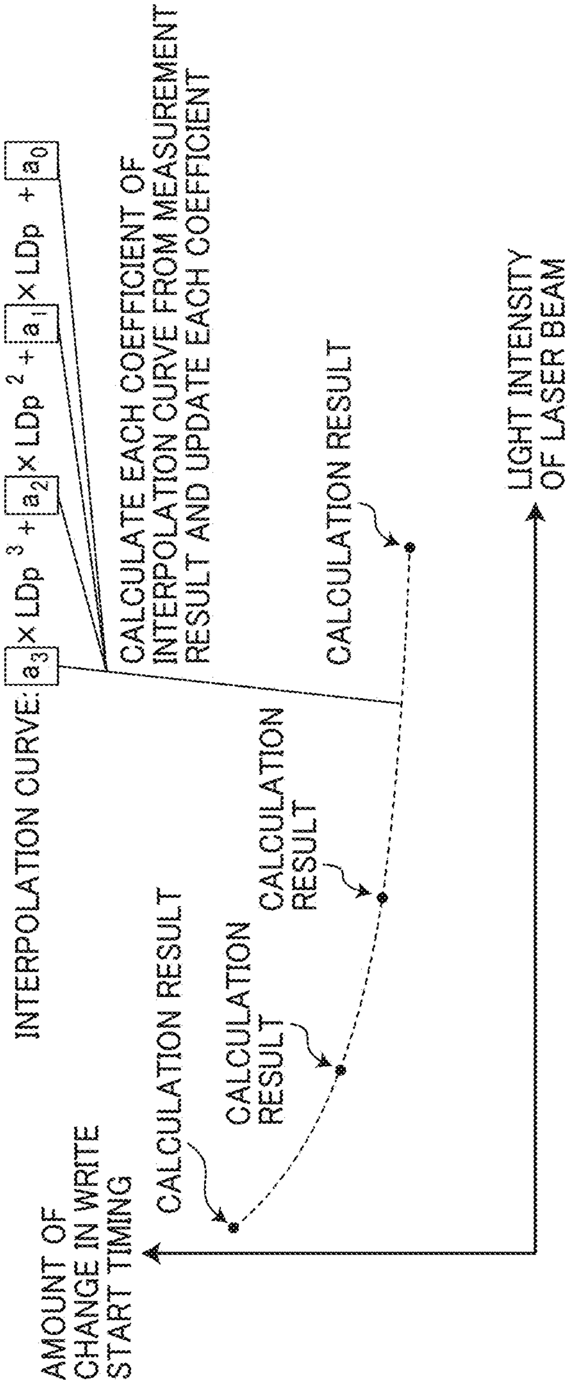
FIG. 23 is a diagram for describing updating of the characteristic value curve in the image forming apparatus according to the embodiment.

FIG. 18 is a diagram for describing an overview of an operation of the characteristic value updating process of the image forming apparatus according to the embodiment. FIG. 19 is a flowchart illustrating an example of a flow of the characteristic value updating process of the image forming apparatus according to the embodiment. FIG. 20 is a diagram for describing an operation of estimating the curve of the amount of change in the write start timing, from a measurement result in the image forming apparatus according to the embodiment. FIG. 21 is a diagram for describing an operation of estimating the (second) curve of the amount of change in the write start timing, from the measurement result in the image forming apparatus according to the embodiment. FIG. 22 is a diagram for describing updating of the characteristic value table in the image forming apparatus according to the embodiment. FIG. 23 is a diagram for describing updating of the characteristic value curve in the image forming apparatus according to the embodiment. The characteristic value updating process of the image forming apparatus 1 according to the present embodiment will be described with reference to FIGS. 18 to 23.

As illustrated in FIGS. 14A to 16, the image forming apparatus 1 according to the present embodiment uses the characteristic value information (characteristic value table or characteristic value curve) representing the amount of change in the write start timing to correct the write start timing. However, when the amount of change in the write start timing of the optical writing device 20 does not match the correction amount of the write start timing calculated from the characteristic value information, the shift is not appropriately corrected. For example, when a spot diameter of the laser beam incident on the photosensor 91 is not narrowed, the spot diameter greatly differs for each optical writing device 20. As a result, the amount of change in the write start timing in response to the change in the light intensity of the laser beam greatly differs for each optical writing device 20. In this case, from the characteristic value information, from which the correction amount is appropriately calculated for one optical writing device 20, the correction amount is not appropriately calculated for another optical writing device 20. Accordingly, in the present embodiment, an operation is performed to update the characteristic value information in accordance with the characteristics (estimated curve of the amount of change in the write start timing) of the optical writing device 20. The updating operation will be described below.

For example, when a user of the image forming apparatus 1 performs an operation to request execution of a process for updating the characteristic value information, the image forming apparatus 1 starts executing the characteristic value updating process. Consequently, the characteristic value information (characteristic value table or characteristic value curve) is updated in accordance with the characteristics (estimated curve of the amount of change in the write start timing) of each optical writing device 20 as illustrated in FIG. 18. The correction amount of the write start timing is calculated using the updated characteristic value information. Thus, the characteristic variation of each optical writing device 20 can be reduced, and a high-quality image can be provided.

In this case, when updating the characteristic value table as the characteristic value information, the image forming apparatus 1 updates the amount of change associated with each light intensity. When updating the characteristic value curve as the characteristic value information, the image forming apparatus 1 updates the coefficients of the respective terms of the polynomial characteristic value curve. The characteristics (estimated curve of the amount of change in the write start timing) of each optical writing device 20 may vary because of the above-described influence of the spot diameter of the laser beam, for example. This variation is less affected by aging and corresponds to physical characteristics of the optical writing device 20. Thus, by executing the characteristic value updating process once immediately after the image forming apparatus 1 is assembled or the optical writing device 20 of the image forming apparatus 1 is replaced, favorable characteristic value information according to the optical writing device 20 can be obtained and the write start timing can be corrected highly accurately. Alternatively, the control device 10 may detect whether the optical writing device 20 is replaced, and automatically execute the characteristic value updating process once in response to detecting the replacement. A specific flow of the characteristic value updating process will be described below with reference to FIGS. 19 to 23.

Step S11

The gain switching unit 106 of the control device 10 switches the gain of the photosensor 91 to a specific gain. Then, the process proceeds to step S12.

Step S12

The control device 10 performs pre-processing for detection of an amount-of-change calculation pattern (described later). Then, the process proceeds to step S13.

Step S13

The control device 10 causes the optical writing device 20 to form the amount-of-change calculation pattern (first pattern), which is a pattern to be used for calculating the amount of change in the write start timing.

The amount-of-change calculation pattern refers to a pattern with which a shift in the main scanning direction is detectable. For example, the amount-of-change calculation pattern includes a combination of patterns having angles different from each other, such as a combination of a horizontal pattern and an oblique pattern. In the present embodiment, a pattern having the same shape as that used in the color matching operation of the image forming apparatus 1 is used as the amount-of-change calculation pattern. In this case, the same shape indicates that the amount-of-change calculation pattern and the color matching pattern have a common angle, a common length, a common width, and a common formation interval. The amount-of-change calculation pattern and the color matching pattern may be formed with the same density. This suppresses the influence of the difference of the shape from the color matching pattern on the calculation result of the amount of change in the write start timing, and enables the characteristics (curve of the amount of change in the write start timing) of the optical writing device 20 to be estimated highly accurately.

The control device 10 may use the laser diodes 21 that emit the laser beams to be incident on the respective photosensors 91 to form the amount-of-change calculation pattern. For example, in the present embodiment, the amount-of-change calculation pattern of two colors, i.e., black and yellow, may be formed. Since the laser beams incident on the respective photosensors 91 are laser beams used for formation of black and yellow images, the amount-of-change calculation pattern may be formed with the two colors. Thus, the colors of the laser diodes 21 are not limited to black and yellow. This can minimize the amount of consumed toner.

Then, the process proceeds to step S14.

Step S14

The control device 10 causes the density detector 45 to detect the toner density of the formed amount-of-change calculation pattern to acquire position information of the amount-of-change calculation pattern. Then, the process proceeds to step S15.

Step S15

The control device 10 determines whether detection of the amount-of-change calculation pattern is successful. When detection is successful (step S15: Yes), the process proceeds to step S16. When detection is unsuccessful (step S15: No), the process proceeds to step S17.

Step S16

The characteristic value processing unit 107 of the control device 10 calculates the amount of change in the write start timing from the acquired position information of the amount-of-change calculation pattern. Then, the process proceeds to step S17.

Step S17

The control device 10 checks whether the amount of change is calculated for all the gains switchable in the gain switching circuit 92. When the amount of change is calculated for all the gains (step S17: Yes), the process proceeds to step S18. When the amount of change is not calculated for all the gains (step S17: No), the process returns to step S11. Note that the calculation of the amount of change is not limited to calculation for all the switchable gains, and may be performed for some of the switchable gains.

Step S18

By iterating the above-described processing of steps S11 to S17, the calculation results of the amount of change for the respective gains in the photosensor 91 are obtained. Based on these calculation results, the characteristic value processing unit 107 calculates values to be stored in the characteristic value table or coefficients of the characteristic value curve. Note that the gains to be switched by the gain switching unit 106 in step S11 in the above-described iterative processing of steps S11 to S17 include a gain to be switched in the print operation.

An operation of calculating the values to be stored in the characteristic value table will be specifically described with reference to FIG. 20. Through the above-described iterative processing of steps S11 to S17, results of the amount of change in the write start timing at each gain resistance value are obtained under the light intensity of the laser beam used in formation of the amount-of-change calculation pattern. The light intensity of the laser beam used in formation of the amount-of-change calculation pattern is not changed midway. Thus, the calculation results spread in the vertical-axis direction as illustrated in FIG. 20. This spread is caused by the difference in the gain resistance value. To estimate the curve of the amount of change in the write start timing from these calculation results, the calculation results are to be re-plotted. The amount of change in the write start timing obtained by changing the light intensity of the laser beam incident on the photosensor 91 with the gain fixed to a certain gain resistance value (reference sensitivity) appears as a curve. In the present embodiment, the calculation results are re-plotted in the following manner. The characteristic value processing unit 107 calculates, for each of the calculation results, a ratio of the gain resistance value, which is obtained by dividing the gain resistance value corresponding to the calculation result by the certain gain resistance value. The characteristic value processing unit 107 converts, by multiplication by the calculated ratio of the gain resistance value, the light intensity of the laser beam used in formation of the amount-of-change calculation pattern into the light intensity of the laser beam. In this manner, the curve of the amount of change in the write start timing with the gain fixed to the certain gain resistance value can be estimated. The certain gain resistance value refers to the gain resistance value to be used in the ordinary usage method of the image forming apparatus 1 (e.g., the gain resistance value to be used in the print operation). The characteristic value processing unit 107 fixes the gain to the gain resistance value to be used in the ordinary usage method of the image forming apparatus 1, and converts, by multiplication by the ratio of the gain resistance value, the light intensity of the laser beam used in formation of the amount-of-change calculation pattern into the light intensity of the laser beam. The characteristic value processing unit 107 thus can estimate the curve of the amount of change in the write start timing at the gain resistance value to be used in the ordinary usage method of the image forming apparatus 1. Consequently, the characteristic value processing unit 107 can calculate the amount of change corresponding to each light intensity of the characteristic value table from the estimated curve of the amount of change in the write start timing as illustrated in FIG. 20.

When the gain of the photosensor 91 is switched in the ordinary usage method of the image forming apparatus 1, for example, in an adjustment operation or the print operation, two or more curves of the amount of change in the write start timing are desirably estimated. The estimation operation will be described with reference to FIG. 21. The estimation method of the curve of the amount of change in the write start timing in this case is similar to that used when one gain resistance value is used in the ordinary usage method of the image forming apparatus 1. That is, the characteristic value processing unit 107 changes the fixed gain resistance value to each gain resistance value to be used in the ordinary usage method of the image forming apparatus 1, and calculates the ratio of the gain resistance value. The characteristic value processing unit 107 converts, by multiplication by the calculated ratio of the gain resistance value, the light intensity of the laser beam used in formation of the amount-of-change calculation pattern into the light intensity of the laser beam. The characteristic value processing unit 107 thus estimates the curve of the amount of change in the write start timing corresponding to each gain resistance value to be used. Consequently, the characteristic value processing unit 107 can calculate the amount of change corresponding to each light intensity in the characteristic value table corresponding to each gain from the estimated curve of the amount of change in the write start timing corresponding to the gain as illustrated in FIG. 21.

As described in FIGS. 20 and 21, when the amount of change is calculated while switching the gain between the gain resistance values corresponding to all the light intensities in the characteristic value table, the number of calculation points becomes enormous and the processing time increases. When the number of calculation points becomes enormous, the gain switching circuit 92 gets complicated, resulting in increased cost. Accordingly, the control device 10 may execute the above-described iterative processing of steps S11 to S17 with calculation points fewer than the number of columns of the characteristic value table. In this case, as illustrated in FIG. 22, the control device 10 performs interpolation processing in accordance with the number of columns of the characteristic value table from the plots representing the calculation results that are fewer than the number of columns of the characteristic value table to estimate the characteristics (curve of the amount of change in the write start timing) of the optical writing device 20. This allows the values (of the amount of change) for updating the characteristic value table to be accurately calculated in a short time.

When calculating the values for updating the characteristic value table, the characteristic value processing unit 107 may set the amount of change in the write start timing corresponding to one calculation result as the reference value, and calculate a difference from the reference value. Such a calculation can limit the values for updating the characteristic value table to a certain level, prevent the overflow of the update value, and reduce the consumption of the memory.

As described above, the number of calculation points for estimating the curve of the amount of change in the write start timing may be, for example, three or four. That is, the above-described iterative processing is executed while the gain switching unit 106 switches the gain among three or four gains. As illustrated in FIGS. 20 and 21 described above, the characteristics (curve of the amount of change in the write start timing) of the optical writing device 20 are nonlinear. In this case, to accurately perform interpolation while minimizing the number of calculation points, at least three calculation results are to be obtained. The number of times the gain switching circuit 92 switches the gain is equal to $2^n$ (n: the number of gain switching signals). When the calculation is performed for three or more points, at least $2^2=4$ calculations can be performed. Thus, the minimum number of calculation points is three or four.

As the above-described interpolation processing, processing based on linear interpolation, for example, is performed. The use of the processing based on linear interpolation enables the shift to be corrected accurately, and a high-quality image to be provided.

An operation of calculating the coefficients of the polynomial characteristic value curve will be described with reference to FIG. 23. The control device 10 executes the above-described iterative processing of steps S11 to S17 with (N+1) calculation points, the number of which is greater than the degree N (N≥2) of the polynomial under the light intensity of the laser beam used in formation of the amount-of-change calculation pattern. That is, the above-described iterative processing is executed while the gain switching unit 106 switches the gain between (N+1) gains. In this case, the method for determining the calculation point is similar to that described above in FIGS. 20 and 21. The characteristic value processing unit 107 calculates the coefficients $a_n$ to $a_0$ for the respective degrees of the approximation expression for the plots of the (N+1) calculation results. Thus, the characteristic value processing unit 107 can accurately approximate the characteristics (curve of the amount of change in the write start timing) of the optical writing device 20 in a short time.

The degree N of the approximation expression that approximate the characteristics (curve of the amount of change in the write start timing) of the optical writing device 20 may be determined to be 3 or 4. This is because the approximation expression of degree of 5 or higher may increase a risk of local distortion of the interpolation curve between the calculation points. Thus, by setting the degree N of the approximation expression to 3 or 4, the approximation curve of the characteristic value curve can be accurately determined while reducing the number of calculation points.

Hereinafter, the values (amounts of change for light intensities) to be stored in the characteristic value table and the coefficients of the polynomial characteristic value curve may be referred to as "characteristic values".

Referring back to FIG. 19, the description is continued. After the processing in step S18, the process proceeds to step S19.

Step S19

The characteristic value processing unit 107 determines whether the characteristic value information can be updated with the calculated characteristic values. When the characteristic value information can be updated (step S19: Yes), the process proceeds to step S20. When the characteristic value information cannot be updated (step S19: No), the characteristic value updating process ends.

Step S20

The characteristic value processing unit 107 updates the characteristic value storage unit 114 with the characteristic values of the characteristic value information calculated by estimating the curve of the amount of change in the write start timing. Specifically, the characteristic value processing unit 107 performs updating using the amounts of change corresponding to the light intensities in the characteristic value table as the characteristic values when the characteristic value information is the characteristic value table, and performs updating using the coefficients of the polynomial characteristic value curve as the characteristic values when the characteristic value information is the characteristic value curve.

The characteristic value of the characteristic value information corresponding to each gain resistance value to be used in the ordinary usage method of the image forming apparatus 1 may be updated based on the calculation results. In this case, the processing load may increase and the load on the capacity of the characteristic value storage unit 114 may increase. To avoid these increases, the estimated curve of the amount of change in the write start timing is a single curve corresponding to a specific gain resistance value. The characteristic value processing unit 107 may update the characteristic value storage unit 114 with the characteristic value of the characteristic value information corresponding to the single curve. When multiple gain resistance values are to be used in the ordinary usage method of the image forming apparatus 1, the correction value calculation unit 105 may use the single curve (i.e., the characteristic value information) of the amount of change in the write start timing estimated by the characteristic value processing unit 107 and a ratio between a gain resistance value to be used and the above-described specific gain resistance value to calculate the amount of change in the write start timing at the gain to be used. In this manner, the correction value calculation unit 105 may calculate the characteristic value corresponding to the amount of change.

The gain resistance value is not limited to the predetermined value, and a value actually measured in advance may be stored in the memory (e.g., the characteristic value storage unit 114). When the characteristic value updating process is executed on the characteristic value table or the characteristic value curve or when the write start timing is corrected using the updated characteristic value table or characteristic value curve, the gain resistance value (actually measured value) stored in the memory is read out and each of the processes may be performed. Consequently, the curve of the amount of change in the write start timing can be highly accurately estimated without being influenced by the variation of components, the shift of the write start timing caused in the print operation can be suppressed, and a high-quality image can be provided.

When the above-described characteristic value updating process ends, the control device 10 may issue a notification indicating the completion of the characteristic value updating process so that the characteristic value updating process is not executed in response to next booting of the image forming apparatus 1. In this case, examples of the notification method include displaying the notification on a display of the image forming apparatus 1 and sending an email to a predetermined address set in advance.

Flow of Color Matching Operation of Image Forming Apparatus

Figure 24:
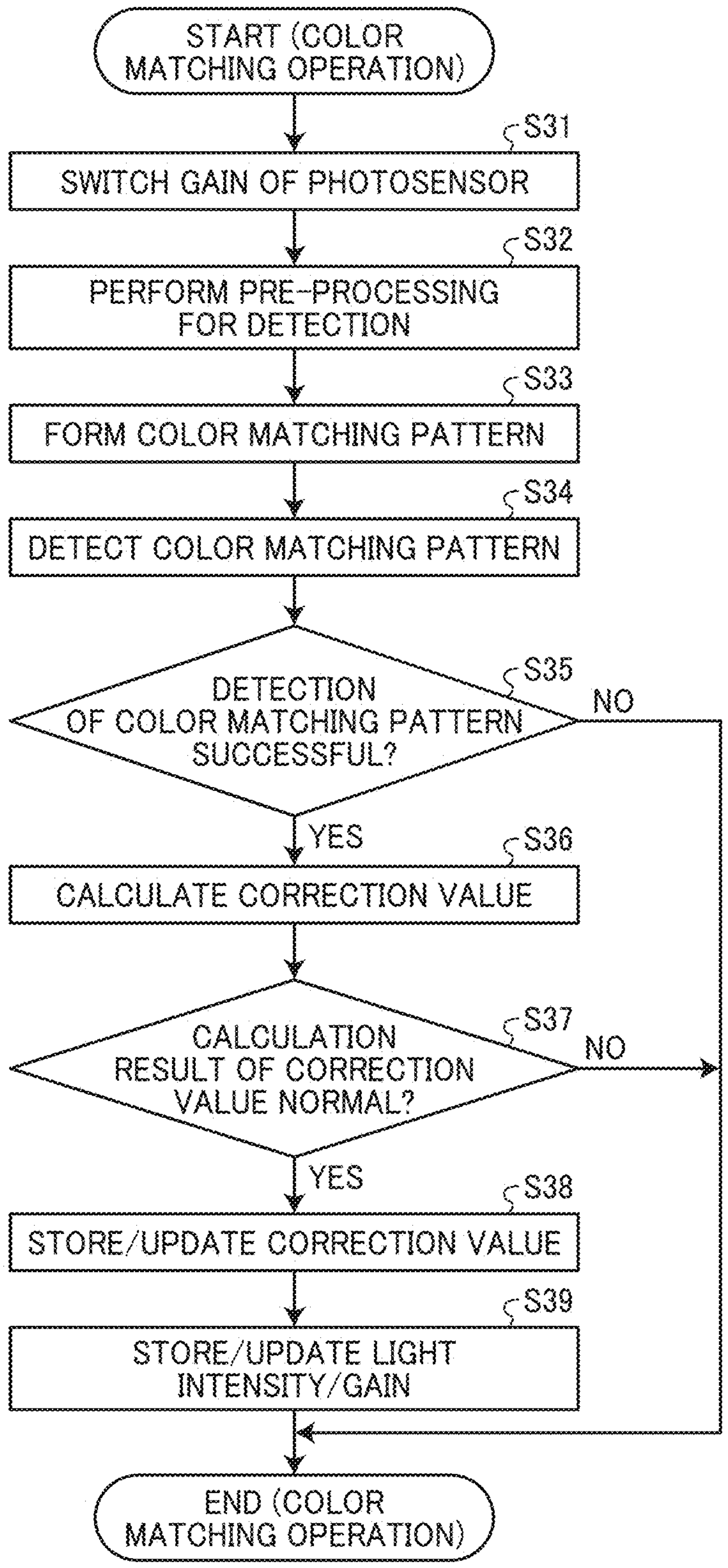
FIG. 24 is a flowchart illustrating an example of a flow of a color matching operation of the image forming apparatus according to the embodiment.

FIG. 24 is a flowchart illustrating an example of a flow of the color matching operation of the image forming apparatus according to the embodiment. The flow of the color matching operation of the image forming apparatus 1 according to the present embodiment will be described with reference to FIG. 24.

Step S31

The gain switching unit 106 of the control device 10 switches the gain of the photosensor 91 in accordance with the light intensity of the laser beam of the laser diode 21 to be used in the color matching operation. Then, the process proceeds to step S32.

Step S32

The control device 10 executes pre-processing for detection. Then, the process proceeds to step S33.

Step S33

The control device 10 forms a color matching pattern (second pattern), which is a pattern to be used for color matching. In the present embodiment, when the color matching pattern is formed, the operation is performed with the function of calculating the correction value using the above-described characteristic value information disabled. Then, the process proceeds to step S34.

Step S34

The control device 10 causes the density detector 45 to detect the toner density of the formed color matching pattern.

Note that the laser diode 21 for forming the color matching pattern and the density detector 45 for detecting the toner density of the color matching pattern are the same as the laser diode 21 for forming the amount-of-change calculation pattern and the density detector 45 for detecting the toner density of the amount-of-change calculation pattern in the above-described characteristic value updating process.

Then, the process proceeds to step S35.

Step S35

The control device 10 determines whether detection of the color matching pattern is successful. When detection is successful (step S35: Yes), the process proceeds to step S36.

When detection is unsuccessful (step S35: No), the color matching operation ends.

Step S36

The correction value calculation unit 105 of the control device 10 uses the detection result of the color matching pattern to calculate the correction value. In this case, when the color matching pattern is formed, the write start timing shifts in accordance with the light intensity at that time. However, since color matching is performed in the shifted state, the correction value calculated by the correction value calculation unit 105 through color matching includes a correction value for the amount of change in the write start timing. Then, the process proceeds to step S37.

Step S37

The control device 10 determines whether the correction value calculated by the correction value calculation unit 105 is normal. When the correction value is normal (step S37: Yes), the process proceeds to step S38. When the correction value is not normal (step S37: No), the color matching operation ends.

Step S38

The correction value calculation unit 105 stores the calculated correction value in the correction value storage unit 112 or updates the correction value storage unit 112 with the calculated correction value. Then, the process proceeds to step S39.

Step S39

After successfully completing the color matching, the control device 10 stores or updates the light intensity of the laser beam and the gain used when the color matching pattern is formed. The color matching operation then ends.

Flow of Print Operation of Image Forming Apparatus

Figure 25:
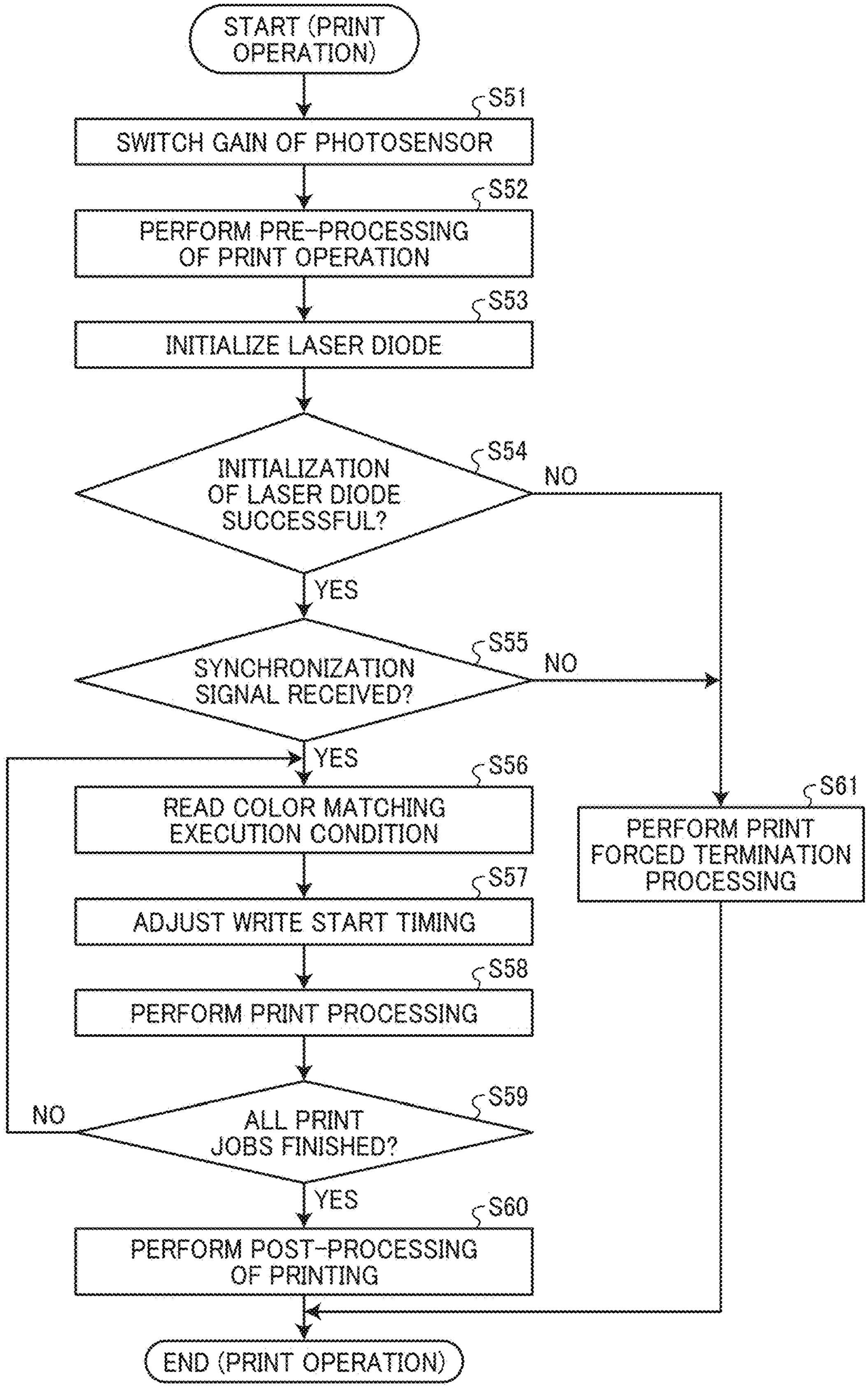
FIG. 25 is a flowchart illustrating an example of a flow of a print operation of the image forming apparatus according to the embodiment.

FIG. 25 is a flowchart illustrating an example of a flow of the print operation of the image forming apparatus according to the embodiment. The flow of the print operation of the image forming apparatus 1 according to the present embodiment will be described with reference to FIG. 25.

Step S51

The gain switching unit 106 of the control device 10 switches the gain of the photosensor 91 in accordance with the light intensity of the laser beam of the laser diode 21 to be used in the print operation of the image forming apparatus 1. Then, the process proceeds to step S52.

Step S52

The control device 10 performs pre-processing of the print operation. Then, the process proceeds to step S53.

Step S53

The light-emission control units 102 of the control device 10 reads information on the gain stored in the gain switching storage unit 113, switches the gain of the photosensor 91 to detect the laser beam with the gain, and initializes the laser diode 21. Then, the process proceeds to step S54.

Step S54

When the laser diode 21 is successfully initialized (step S54: Yes), the process proceeds to step S55. When the initialization is not successful (step S54: No), the process proceeds to step S61.

Step S55

The sensor control unit 101 checks whether the photosensor 91 detects the laser beam and the synchronization signal is received from the photosensor 91. When the synchronization signal is received (step S55: Yes), the process proceeds to step S56. When the synchronization signal is not received (step S55: No), the process proceeds to step S61.

Step S56

The control device 10 reads the color matching execution condition. Specifically, the control device 10 reads the information on the gain stored in the color matching operation described above. Then, the process proceeds to step S57.

Step S57

When the light intensity of the laser beam in the print operation changes from the light intensity of the laser beam in the color matching operation, the write start timing shifts in accordance with the characteristics (curve of the amount of change in the write start timing) of the optical writing device 20. Thus, the correction value calculation unit 105 of the control device 10 uses the characteristic value table or the characteristic value curve to calculate the correction value for correcting the shift of the write start timing. The write start timing is thus adjusted.

When a high-quality image or pattern is formed for which the influence of the characteristics (curve of the amount of change in the write start timing) of the optical writing device 20 is not ignorable, the operation may be performed with the function of calculating the correction value using the above-described characteristic value information enabled.

Then, the process proceeds to step S58.

Step S58

The control device 10 executes a printing process. Then, the process proceeds to step S59.

Step S59

When all the print jobs are finished (step S59: Yes), the process proceeds to step S60. When all the print jobs are not finished (step S59: No), the process returns to step S56.

Step S60

The control device 10 executes post-processing of printing. The print operation then ends.

Step S61

The control device 10 executes print forced termination processing to forcibly terminate the print operation. The print operation then ends.

As described above, in the image forming apparatus 1 according to the present embodiment, the laser diode 21 emits a laser beam. The polygon mirror 23 deflects the laser beam emitted by the laser diode 21 to scan the photoconductor drum 30 with the laser beam. The photosensor 91 detects, in order to determine a write start timing, the laser beam emitted by the laser diode 21. The write start timing is a timing for forming a latent image by scanning the photoconductor drum 30 with the laser beam through the polygon mirror 23. The gain switching circuit 92 switches a gain of the photosensor 91 for detecting the laser beam, to any one of the multiple gains. The control device 10 controls an operation of the image forming apparatus 1. The light-emission control unit 102 controls a light intensity of the laser beam to be emitted by the laser diode 21. The gain switching unit 106 switches the gain via the gain switching circuit 92 in accordance with the light intensity that has been set. The correction value calculation unit 105 corrects a shift of the write start timing, using characteristic value information indicating a relationship between the light intensity and an amount of change in the write start timing. The characteristic value processing unit 107 calculates the amount of change in the write start timing while the gain switching unit 106 switches the gain to each gain, and updates a characteristic value included in the characteristic value information, based on the calculated amount of change. Thus, the shift of the write start timing that occurs in response to gain switching can be appropriately corrected, the shift can be corrected by the correction value corresponding to the image forming apparatus 1, and the cost can be reduced.

In the embodiments described above, when at least one of the functional units of the control device 10 of the image forming apparatus 1 is implemented by execution of a program, the program is pre-stored in, for example, a ROM and provided. Alternatively, in the embodiments described above, the program that is executed by the control device 10 of the image forming apparatus 1 may be stored in a computer-readable recording medium in an installable or executable file format so that the program can be provided. Examples of the computer-readable recording medium include, but are not limited to, a compact disc read only memory (CD-ROM), a flexible disk (FD), a compact disc recordable (CD-R), and a digital versatile disc (DVD). Alternatively, in the embodiments described above, the program that is executed by the control device 10 of the image forming apparatus 1 may be stored on a computer connected to a network such as the Internet so that the program can be downloaded through the network and provided. Alternatively, in the embodiments described above, the program that is executed by the control device 10 of the image forming apparatus 1 may be provided or distributed through a network such as the Internet. In the embodiments described above, the program that is executed by the control device 10 of the image forming apparatus 1 has a module structure including at least one of the functional units described above. Regarding the actual hardware related to the program, the CPU reads the program from the storage device described above and executes the program to load the functional units described above onto the main memory and implement the functional units.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application-specific integrated circuits (ASICs), field-programmable gate arrays (FPGAs), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of an FPGA or ASIC.

Aspects of the present disclosure are as follows.

According to Aspect 1, an image forming apparatus includes a light-emitting element, a deflector, a photodetector element, a sensitivity switching circuit, and a controller. The light-emitting element emits a beam. The deflector deflects the beam emitted by the light-emitting element to scan a photoconductor with the beam. The photodetector element detects, in order to determine a write start timing, the beam emitted by the light-emitting element. The write start timing is a timing for forming a latent image by scanning the photoconductor with the beam through the deflector. The sensitivity switching circuit switches a detection sensitivity of the photodetector element for detecting the beam, to any one of multiple sensitivities. The controller controls an operation of the image forming apparatus. The controller includes a light-emission control unit, a sensitivity switching unit, a correction unit, and an updating unit. The light-emission control unit controls a light intensity of the beam to be emitted by the light-emitting element. The sensitivity switching unit switches the detection sensitivity via the sensitivity switching circuit in accordance with the light intensity that has been set. The correction unit corrects a shift of the write start timing, using characteristic value information indicating a relationship between the light intensity and an amount of change in the write start timing. The updating unit calculates the amount of change in the write start timing while the sensitivity switching unit switches the detection sensitivity to each sensitivity among the multiple sensitivities, and updates a characteristic value included in the characteristic value information, based on the calculated amount of change.

An image forming apparatus includes a photoconductor; a light-emitting element to emit a beam; a deflector to deflect the beam emitted by the light-emitting element to scan the photoconductor with the beam to form a latent image on the photoconductor; a photodetector element to detect the beam with multiple sensitivities to determine a write start timing at which the light-emitting element start emitting the beam; and circuitry. The circuitry switches to any one of the multiple sensitivities of the photodetector element; controls the light-emitting element to set a light intensity of the beam; switches the multiple sensitivities according to the light intensity; uses characteristic value information of a relationship between the light intensity and an amount of change in the write start timing to correct a shift in the write start timing; calculates the amount of change while switching to each of the multiple sensitivities; and updates a characteristic value in the characteristic value information based on the amount of change.

According to Aspect 2, in the image forming apparatus of Aspect 1, the sensitivity switching unit switches the detection sensitivity to any one of the multiple sensitivities. The controller forms a first pattern to be used for calculating the amount of change in the write start timing. The image forming apparatus further includes a detector to detect a density of the first pattern. The updating unit calculates the amount of change in the write start timing, based on the density detected by the detector. An iterative process is executed while the sensitivity switching unit switches the detection sensitivity to a different sensitivity among the multiple sensitivities. The iterative process includes a formation operation of forming the first pattern by the controller, a detection operation of detecting the density of the first pattern by the detector, and a calculation operation of calculating the amount of change in the write start timing by the updating unit. The updating unit calculates a ratio of a sensitivity corresponding to each calculation operation of the iterative process to a reference sensitivity, the reference sensitivity being one of the multiple sensitivities, and converts, by multiplication by each ratio, a light intensity of the beam emitted by the light-emitting element during formation of the first pattern into a light intensity corresponding to the amount of change calculated in the corresponding calculation operation, and updates the characteristic value included in the characteristic value information, based on the converted light intensity and the corresponding amount of change.

The image forming apparatus further includes: a transfer belt on which the latent image on the photoconductor is transferred; and a density detector to detect a density of a calculation pattern of the latent image on the transfer belt. The circuitry is further configured to switch to any one of the multiple sensitivities; form the pattern on the transfer belt to calculate the amount of change; control the detector to detect the density of the pattern; calculate the amount of change based on the density detected by the detector; perform an iterative process by repeating, to obtain a relationship between the amount of change and each of the multiple sensitivities: forming the calculation pattern with the beam emitted by the light-emitting element with a first light intensity; detecting the density of the calculation pattern by the density detector; and calculating the amount of change based on the density of the calculation pattern detected by the density detector while switching to each of the multiple sensitivities; divide each of the multiple sensitivities by a reference sensitivity selected from the multiple sensitivities to calculate a sensitivity ratio; multiply the first light intensity by the sensitivity ratio to convert into a second light intensity corresponding to the amount of change; and update the characteristic value in the characteristic value information based on the second light intensity and the amount of change corresponding to the second light intensity.

According to Aspect 3, in the image forming apparatus of Aspect 2, the correction unit calculates a correction value that eliminates a difference between an amount of change in the write start timing caused in a case where the light-emitting element operates with a light intensity set for a print operation and an amount of change in the write start timing caused in a case where the light-emitting element operates with a light intensity set for color matching for correcting a color shift between multiple colors.

The circuitry is further configured to control the light-emitting element to emit the light with a third light intensity to form an image on the transfer belt as a print operation; control the light-emitting element to emit the light with a fourth light intensity to form a color matching pattern on the transfer belt as a color matching to correct a color shift between multiple colors; calculate a correction value to reduce a difference between the amount of change when the light-emitting element operates with the third light intensity during the print operation; and the amount of change when the light-emitting element emits the light with the fourth light intensity during the color matching.

According to Aspect 4, in the image forming apparatus of Aspect 3, the light-emitting element used in formation of the first pattern and the detector that detects the density of the first pattern are same as the light-emitting element used in formation of a second pattern to be used for the color matching and the detector that detects a density of the second pattern, respectively.

The circuitry is further configured to control the light-emitting element to: emit the light to form the pattern on the transfer belt; and emit the light to form the color matching pattern on the transfer belt; and control the detector to: detect the density of the pattern; and detect the density of the color matching pattern.

According to Aspect 5, in the image forming apparatus of Aspect 4, the first pattern and the second pattern have a common angle, a common length, a common width, and a common formation interval.

The circuitry is further configured to form the calculation pattern and the color matching pattern, having a common angle, a common length, a common width, and a common formation interval on the transfer belt.

According to Aspect 6, in the image forming apparatus of Aspect 4, the first pattern and the second pattern are formed with a same density.

The circuitry is further configured to form the calculation pattern and the color matching pattern on the transfer belt with a same density.

According to Aspect 7, in the image forming apparatus of any one of Aspects 2 to 6, the light-emitting element includes multiple light-emitting elements, and the controller forms the first pattern, using a light-emitting element that emits a beam to be incident on the photodetector element among the multiple light-emitting elements.

The image forming apparatus further includes multiple light-emitting elements including the light-emitting element. The circuitry is configured to form the calculation pattern, using a light-emitting element of the multiple intensities, that emits a beam to be incident on the photodetector element.

According to Aspect 8, in the image forming apparatus of any one of Aspects 2 to 7, the different sensitivity to which the detection sensitivity is switched by the sensitivity switching unit in the iterative process includes a sensitivity to which the detection sensitivity is switched by the sensitivity switching unit in a print operation.

The multiple sensitivities switched during the iterative process includes a sensitivity switched for a print operation to form an image on the transfer belt.

According to Aspect 9, in the image forming apparatus of any one of Aspects 2 to 8, the different sensitivity to which the detection sensitivity is switched by the sensitivity switching unit in the iterative process includes a sensitivity higher than or equal to a product of a ratio of a maximum light intensity to a reference light intensity and a sensitivity to which the detection sensitivity is switched by the sensitivity switching unit in a print operation. The reference light intensity is a light intensity of the beam of the light-emitting element used in the print operation.

The multiple sensitivity switched during the iterative process includes a sensitivity higher than or equal to a product of a ratio of a maximum light intensity to a reference light intensity and a sensitivity switched for a print operation to form an image on the transfer belt, the reference light intensity being a light intensity of the beam of the light-emitting element used in the print operation.

According to Aspect 10, in the image forming apparatus of Aspects 2 to 9, the different sensitivity to which the detection sensitivity is switched by the sensitivity switching unit in the iterative process includes a sensitivity lower than or equal to a product of a ratio of a minimum light intensity to a reference light intensity and a sensitivity to which the detection sensitivity is switched by the sensitivity switching unit in a print operation. The reference light intensity is a light intensity of the beam of the light-emitting element used in the print operation.

The multiple sensitivity switched during the iterative process includes a sensitivity lower than or equal to a product of a ratio of a minimum light intensity to a reference light intensity and a sensitivity switched for a print operation to form an image on the transfer belt, the reference light intensity being a light intensity of the beam of the light-emitting element used in the print operation.

According to Aspect 11, the image forming apparatus of any one of Aspects 1 to 10, further includes a memory. The memory stores the characteristic value information. The characteristic value information stored in the memory includes a characteristic value corresponding to a sensitivity to which the detection sensitivity is switched by the sensitivity switching unit in a print operation.

The image forming apparatus further includes a memory that stores the characteristic value information. The characteristic value information stored in the memory includes a characteristic value corresponding to a sensitivity switched for a print operation to form an image on a transfer belt.

According to Aspect 12, in the image forming apparatus of any one of Aspects 1 to 11, the updating unit updates the characteristic value included in the characteristic value information indicating a relationship between the light intensity and the amount of change that are related to a specific sensitivity among the multiple sensitivities, and the correction unit uses the characteristic value information corresponding to the specific sensitivity and a ratio between a sensitivity to be used and the specific sensitivity to calculate an amount of change in the write start timing for the sensitivity to be used, and calculates a correction value corresponding to the calculated amount of change.

The circuitry further updates the characteristic value in the characteristic value information indicating a relationship between the light intensity and the amount of change that are related to a specific sensitivity among the multiple sensitivities; uses the characteristic value information corresponding to the specific sensitivity and a ratio between a sensitivity to be used and the specific sensitivity to calculate an amount of change in the write start timing for the sensitivity to be used; and calculates a correction value corresponding to the calculated amount of change.

According to Aspect 13, in the image forming apparatus of any one of Aspects 2 to 10, the characteristic value information includes tabular information for associating the light intensity with the amount of change in the write start timing, and the updating unit updates the characteristic value included in the characteristic value information by interpolation processing on plots each defined by the amount of change in the write start timing calculated in the iterative process and the converted light intensity corresponding to the amount of change.

The characteristic value information includes tabular information for associating the light intensity with the amount of change in the write start timing. The circuitry updates the characteristic value in the characteristic value information by interpolation processing on plots each defined by the amount of change in the write start timing calculated in the iterative process and the converted light intensity corresponding to the amount of change.

According to Aspect 14, in the image forming apparatus of Aspect 13, the iterative process is executed while the sensitivity switching unit switches the detection sensitivity among three or four sensitivities.

The circuitry performs the iterative process while switching to three or four sensitivities.

According to Aspect 15, in the image forming apparatus of Aspect 13 or 14, the interpolation processing includes processing based on linear interpolation.

According to Aspect 16, in the image forming apparatus of any one of Aspects 2 to 10, the characteristic value information includes a characteristic value curve represented by $a_n$ Nth-degree polynomial indicating a relationship between the light intensity and the amount of change in the write start timing, and the updating unit calculates a coefficient of each degree of an approximation expression for plots each defined by the amount of change in the write start timing calculated in the iterative process and the converted light intensity corresponding to the amount of change, and updates the characteristic value of the characteristic value curve with the calculated coefficient.

The characteristic value information includes a characteristic value curve represented by an Nth-degree polynomial indicating a relationship between the light intensity and the amount of change in the write start timing. The circuitry calculates a coefficient of each degree of an approximation expression for plots each defined by the amount of change in the write start timing calculated in the iterative process and the converted light intensity corresponding to the amount of change; and updates the characteristic value of the characteristic value curve with the calculated coefficient.

According to Aspect 17, in the image forming apparatus of Aspect 16, the iterative process is executed while the sensitivity switching unit switches the detection sensitivity among (N+1) sensitivities.

The circuitry performs the iterative process while switching to (N+1) sensitivities.

According to Aspect 18, in the image forming apparatus of Aspect 16 or 17, the characteristic value curve is represented by a third-degree or fourth-degree polynomial.

According to Aspect 19, in the image forming apparatus of any one of Aspects 3 to 6, in the print operation, an operation of the correction unit for calculating the correction value using the characteristic value information is enabled, and in the color matching, the operation of the correction unit for calculating the correction value using the characteristic value information is disabled.

The circuitry further enables an operation of calculating the correction value using the characteristic value information in the print operation, and disables the operation of calculating the correction value using the characteristic value information in the color matching.

According to Aspect 20, in the image forming apparatus of any one of Aspects 1 to 19, the light-emission control unit controls the light intensity of the beam emitted by the light-emitting element to be constant over a period for which the photoconductor is scanned with the beam.

According to Aspect 21, in the image forming apparatus of any one of Aspects 1 to 20, the light-emitting element includes multiple light-emitting elements, and the photodetector element detects beams emitted by the multiple light-emitting elements.

The image forming apparatus further includes multiple light-emitting elements including the light-emitting element. The photodetector element detects beams emitted by the multiple light-emitting elements.

According to Aspect 22, in the image forming apparatus of any one of Aspects 1 to 21, the photodetector element has a slit to limit a direction in which the beam is incident on the photodetector element.

According to Aspect 23, in the image forming apparatus of any one of Aspects 1 to 22, the multiple sensitivities among which the sensitivity switching unit switches the detection sensitivity are stored in a memory as values actually measured in advance.

According to Aspect 24, in the image forming apparatus of any one of Aspects 1 to 23, the sensitivity switching circuit includes a resistor and a switching element. The resistor is connected to the photodetector element. The switching element switches between conducting and not conducting power to the resistor in accordance with a signal from the sensitivity switching unit.

According to Aspect 25, the image forming apparatus of any one of Aspects 1 to 24, further includes an optical writing device. The optical writing device includes the light-emitting element, the deflector, and the photodetector element. The controller detects whether the optical writing device is replaced. The updating unit, when replacement of the optical writing device is detected by the controller, calculates the amount of change in the write start timing while the sensitivity switching unit switches the detection sensitivity to each sensitivity among the multiple sensitivities, and updates the characteristic value included in the characteristic value information, based on the calculated amount of change.

In other words, the image forming apparatus further includes an optical writing device including the light-emitting element, the deflector, and the photodetector element. The circuitry detects whether the optical writing device is replaced, and, in response to a detection of replacement of the optical writing device, calculates the amount of change in the write start timing while switching to each of the multiple sensitivities; and updates the characteristic value included in the characteristic value information, based on the calculated amount of change.

According to Aspect 26, in the image forming apparatus of any one of Aspects 1 to 25, the controller issues a notification indicating completion of updating of the characteristic value when the characteristic value included in the characteristic value information is updated by the updating unit.

The invention claimed is:

1. An image forming apparatus comprising:
a photoconductor;
a light-emitting element to emit a beam;
a deflector to deflect the beam emitted by the light-emitting element to scan the photoconductor with the beam to form a latent image on the photoconductor;
a photodetector element to detect the beam with multiple sensitivities to determine a write start timing at which the light-emitting element start emitting the beam; and
circuitry configured to:
switch to any one of the multiple sensitivities of the photodetector element;
control the light-emitting element to set a light intensity of the beam;
switch the multiple sensitivities according to the light intensity;
use characteristic value information of a relationship between the light intensity and an amount of change in the write start timing to correct a shift in the write start timing;
calculate the amount of change while switching to each of the multiple sensitivities; and
update a characteristic value in the characteristic value information based on the amount of change.

2. The image forming apparatus according to claim 1, further comprising:
a transfer belt on which the latent image on the photoconductor is transferred; and
a density detector to detect a density of a calculation pattern of the latent image on the transfer belt,
wherein the circuitry is further configured to:
switch to any one of the multiple sensitivities;
form the pattern on the transfer belt to calculate the amount of change;
control the detector to detect the density of the pattern;
calculate the amount of change based on the density detected by the detector;
perform an iterative process by repeating, to obtain a relationship between the amount of change and each of the multiple sensitivities:
forming the calculation pattern with the beam emitted by the light-emitting element with a first light intensity;
detecting the density of the calculation pattern by the density detector; and
calculating the amount of change based on the density of the calculation pattern detected by the density detector,
while switching to each of the multiple sensitivities;
divide each of the multiple sensitivities by a reference sensitivity selected from the multiple sensitivities to calculate a sensitivity ratio;
multiply the first light intensity by the sensitivity ratio to convert into a second light intensity corresponding to the amount of change; and
update the characteristic value in the characteristic value information based on the second light intensity and the amount of change corresponding to the second light intensity.

3. The image forming apparatus according to claim 2, wherein the circuitry is further configured to:
control the light-emitting element to emit the light with a third light intensity to form an image on the transfer belt as a print operation;
control the light-emitting element to emit the light with a fourth light intensity to form a color matching pattern on the transfer belt as a color matching to correct a color shift between multiple colors;
calculate a correction value to reduce a difference between:
the amount of change when the light-emitting element operates with the third light intensity during the print operation; and
the amount of change when the light-emitting element emits the light with the fourth light intensity during the color matching.

4. The image forming apparatus according to claim 3, wherein the circuitry is further configured to:
control the light-emitting element to:
emit the light to form the pattern on the transfer belt; and
emit the light to form the color matching pattern on the transfer belt; and
control the detector to:
detect the density of the pattern; and
detect the density of the color matching pattern.

5. The image forming apparatus according to claim 4, wherein the circuitry is further configured to:
form the calculation pattern and the color matching pattern, having a common angle, a common length, a common width, and a common formation interval on the transfer belt.

6. The image forming apparatus according to claim 3, wherein the circuitry is further configured to:
enable an operation of calculating the correction value using the characteristic value information in the print operation, and
disable the operation of calculating the correction value using the characteristic value information in the color matching.

7. The image forming apparatus according to claim 2, further comprising:
multiple light-emitting elements including the light-emitting element, and
the circuitry is configured to form the calculation pattern, using a light-emitting element of the multiple intensities, that emits a beam to be incident on the photodetector element.

8. The image forming apparatus according to claim 2, wherein:
the multiple sensitivities switched during the iterative process includes a sensitivity switched for a print operation to form an image on the transfer belt.

9. The image forming apparatus according to claim 2, wherein:
the multiple sensitivity switched during the iterative process includes a sensitivity higher than or equal to a product of a ratio of a maximum light intensity to a reference light intensity and a sensitivity switched for a print operation to form an image on the transfer belt, the reference light intensity being a light intensity of the beam of the light-emitting element used in the print operation.

10. The image forming apparatus according to claim 2, wherein:

the multiple sensitivity switched during the iterative process includes a sensitivity lower than or equal to a product of a ratio of a minimum light intensity to a reference light intensity and a sensitivity switched for a print operation to form an image on the transfer belt, the reference light intensity being a light intensity of the beam of the light-emitting element used in the print operation.

11. The image forming apparatus according to claim 2, wherein:

the characteristic value information includes tabular information for associating the light intensity with the amount of change in the write start timing, and the circuitry is configured to update the characteristic value in the characteristic value information by interpolation processing on plots each defined by the amount of change in the write start timing calculated in the iterative process and the converted light intensity corresponding to the amount of change.

12. The image forming apparatus according to claim 2, wherein:

the characteristic value information includes a characteristic value curve represented by an Nth-degree polynomial indicating a relationship between the light intensity and the amount of change in the write start timing, and the circuitry is configured to:

calculate a coefficient of each degree of an approximation expression for plots each defined by the amount of change in the write start timing calculated in the iterative process and the converted light intensity corresponding to the amount of change; and update the characteristic value of the characteristic value curve with the calculated coefficient.

13. The image forming apparatus according to claim 1, further comprising:

a memory that stores the characteristic value information, wherein the characteristic value information stored in the memory includes a characteristic value corresponding to a sensitivity switched for a print operation to form an image on a transfer belt.

14. The image forming apparatus according to claim 1, wherein the circuitry is further configured to:

update the characteristic value in the characteristic value information indicating a relationship between the light intensity and the amount of change that are related to a specific sensitivity among the multiple sensitivities;

use the characteristic value information corresponding to the specific sensitivity and a ratio between a sensitivity to be used and the specific sensitivity to calculate an amount of change in the write start timing for the sensitivity to be used; and calculate a correction value corresponding to the calculated amount of change.

15. The image forming apparatus according to claim 1, wherein:

the circuitry is configured to control the light intensity of the beam emitted by the light-emitting element to be constant over a period for which the photoconductor is scanned with the beam.

16. The image forming apparatus according to claim 1, further comprising: multiple light-emitting elements including the light-emitting element, and the photodetector element detects beams emitted by the multiple light-emitting elements.

17. The image forming apparatus according to claim 1, wherein:

the photodetector element has a slit to limit a direction in which the beam is incident on the photodetector element.

18. The image forming apparatus according to claim 1, further comprising a circuit, wherein the circuit includes:

a resistor connected to the photodetector element; and a switching element to switch between conducting and not conducting power to the resistor in accordance with a signal.

19. The image forming apparatus according to claim 1, further comprising:

an optical writing device including the light-emitting element, the deflector, and the photodetector element, wherein the circuitry is configured:

to detect whether the optical writing device is replaced, and to, in response to a detection of replacement of the optical writing device, calculate the amount of change in the write start timing while switching to each of the multiple sensitivities; and update the characteristic value included in the characteristic value information, based on the calculated amount of change.

20. The image forming apparatus according to claim 1, wherein:

the circuitry is configured to issue a notification indicating completion of updating of the characteristic value when the characteristic value included in the characteristic value information updated.

* * * * *